(12) United States Patent
Ke

(10) Patent No.: US 12,302,222 B2
(45) Date of Patent: May 13, 2025

(54) NETWORK SERVICE CONTROL METHOD AND COMMUNICATIONS DEVICE

(71) Applicant: VIVO MOBILE COMMUNICATION CO., LTD., Guangdong (CN)

(72) Inventor: Xiaowan Ke, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 527 days.

(21) Appl. No.: 17/216,843

(22) Filed: Mar. 30, 2021

(65) Prior Publication Data

US 2021/0219211 A1 Jul. 15, 2021

Related U.S. Application Data

(63) Continuation of application No. PCT/CN2019/107762, filed on Sep. 25, 2019.

(30) Foreign Application Priority Data

Sep. 30, 2018 (CN) .......................... 201811161592.X

(51) Int. Cl.
*H04W 48/18* (2009.01)
*H04W 48/14* (2009.01)
*H04W 48/16* (2009.01)
*H04W 36/14* (2009.01)

(52) U.S. Cl.
CPC ........... *H04W 48/14* (2013.01); *H04W 48/16* (2013.01); *H04W 36/1443* (2023.05)

(58) Field of Classification Search
CPC ...... H04W 48/14; H04W 36/14; H04W 48/16
See application file for complete search history.

(56) References Cited

U.S. PATENT DOCUMENTS

| | | | |
|---|---|---|---|
| 11,140,592 B2 * | 10/2021 | Li | H04W 36/00837 |
| 12,101,712 B2 * | 9/2024 | Chun | H04W 48/14 |
| 2011/0110354 A1 | 5/2011 | Jiang et al. | |
| 2017/0318028 A1 * | 11/2017 | Salkini | H04J 13/00 |
| 2018/0014340 A1 | 1/2018 | Hill et al. | |
| 2018/0295509 A1 | 10/2018 | Lee et al. | |
| 2018/0317164 A1 * | 11/2018 | Luo | H04W 48/12 |
| 2019/0191367 A1 * | 6/2019 | Ni | H04W 76/11 |

(Continued)

FOREIGN PATENT DOCUMENTS

| CN | 1758654 A | 4/2006 |
|---|---|---|
| CN | 101646205 A | 2/2010 |

(Continued)

OTHER PUBLICATIONS

International Search Report and Written Opinion of the International Searching Authority regarding International Patent Application No. PCT/CN2019/107762, dated Dec. 17, 2019. Translation provided by Bohui Intellectual Property.

(Continued)

*Primary Examiner* — Dai Phuong
(74) *Attorney, Agent, or Firm* — Harness, Dickey & Pierce, P.L.C.

(57) ABSTRACT

A network service control method includes: obtaining first information, and performing at least one of a first related operation of a first service, a first related operation of a first DNN, and a first related operation of a first network based on the first information.

19 Claims, 9 Drawing Sheets

(56) References Cited

U.S. PATENT DOCUMENTS

| | | | |
|---|---|---|---|
| 2020/0128601 A1* | 4/2020 | Willars | H04W 76/16 |
| 2021/0092669 A1* | 3/2021 | Wang | H04W 48/08 |
| 2021/0099924 A1* | 4/2021 | Shih | H04W 36/0061 |
| 2021/0219226 A1* | 7/2021 | Liao | H04W 48/18 |

FOREIGN PATENT DOCUMENTS

| | | |
|---|---|---|
| CN | 108347748 A | 7/2018 |
| CN | 109215978 A | 1/2019 |
| EP | 3531746 A1 | 8/2019 |
| KR | 101629925 B1 | 6/2016 |
| KR | 101662027 B1 | 10/2016 |
| KR | 20180032461 A | 3/2018 |
| WO | WO-2016049819 A1 | 4/2016 |
| WO | WO-2016175479 A1 | 11/2016 |
| WO | WO-2018090172 A1 | 5/2018 |
| WO | WO-2018172182 A1 | 9/2018 |

OTHER PUBLICATIONS

First Office Action regarding Chinese Patent Application No. 201811161592.X, dated Oct. 28, 2020. Translation provided by Bohui Intellectual Property.

Supplementary European Search Report regarding Patent Application No. 19867330.3-1218/3860089; PCT/CN2019/107762, dated Oct. 26, 2021.

"Update of Solution #4: Support of NPN subscription," Samsung, et al., SA WG2 Meeting #129Bis, S2-1813179 (wasS2-181365), dated Nov. 30, 2018.

"Solution for accessing to PLMN services via NPN," vivo, SA WG2 Meeting #129bis, S2-1811793, dated Nov. 30, 2018.

"Solution for accessing to Non Public Network services via PLMN," vivo, SA WG2 Meeting #129, S2-1810200, dated Oct. 19, 2018.

"Solution for the key issue #1 NW discovery & selection for non-public networks," Samsung, SQ WG2 Meeting #128-bis, S2-188277 (was SW-18xxxx), dated Aug. 24, 2018.

Han Yuxi, "High-Speed Reail 2G/4G Optimization Experience Based on Multiple RRU's Sharing Cells", Proceedings of the 2016 Communication Network and Information Technology Annual Conference of the Liaoning Provincial Communications Society, pp. 262-267, dated Jul. 25, 2016.

3GPP TSG SSA, "Study on 5GS Enhanced Support of Vertical andLAN Services (Release 16)", 3GPP TR 23.734 V0.2.0, Aug. 2018.

Second Office Action regarding Chinese Patent Application No., 201811161592.X, dated May 21, 2021.

Third Office Action regarding Chinese Patent Application No. 201811161592.X, dated Nov. 1, 2021. Translation provided by Bohui Intellectual Property.

First Office Action regarding Japanese Patent Application No. 2021-517838, dated May 16, 2022. Translation provided by Bohui Intellectual Property.

Rejection regarding Japanese Patent Application No. 2021-517838, dated Aug. 9, 2023. Translation provided by Bohui Intellectual Property.

Reconsideration Report By Examiner regarding Japanese Patent Application No. 2021-517838, dated Nov. 28, 2023. Translation provided by Bohui Intellectual Property.

Second Office Action regarding Japanese Patent Application No. 2021-517838, dated Nov. 28, 2023. Translation provided by Bohui Intellectual Property.

* cited by examiner

NETWORK SERVICE CONTROL METHOD AND COMMUNICATIONS DEVICE

CROSS REFERENCE

This application is a Bypass Continuation Application of PCT/CN2019/107762, filed on Sep. 25, 2019, which claims priority to Chinese Patent Application No. 201811161592.X, filed on Sep. 30, 2018, which are incorporated herein by reference in their entirety.

TECHNICAL FIELD

The present disclosure relates to the field of communications technologies, and in particular, to a network service control method and a communications device.

BACKGROUND

Many vertical industries have communication requirements, such as railway dispatching and automatic control. A non-public network can be provided for the vertical industries by using a 5G communications technology, to meet the communications requirements of the vertical industries.

SUMMARY

According to a first aspect, some embodiments of the present disclosure provide a network service control method, which is applied to a first communications device, and includes:
  obtaining first information, where the first information includes at least one of the following: first related information of a first service, first related information of a first network, information about a first data network name (Data Network Name, DNN), area information of an allowed and/or supported area of the first DNN, network description information of a non-public network, area information of a service area of the non-public network, information about whether a current area supports and/or allows the first service, information about whether a target area supports and/or allows the first service, information about whether the current area supports and/or allows access to the first network, or information about whether the target area supports and/or allows access to the first network; and
  performing at least one of a first related operation of the first service, a first related operation of the first DNN, or a first related operation of the first network based on the first information.

According to a second aspect, some embodiments of the present disclosure provide a network service control method, which is applied to a second communications device, and includes:
  sending first information, where the first information includes at least one of the following: first related information of a first service, first related information of a first network, information about a first DNN, area information of an allowed and/or supported area of the first DNN, network description information of a non-public network, area information of a service area of the non-public network, information about whether a current area supports and/or allows the first service, information about whether a target area supports and/or allows the first service, information about whether the current area supports and/or allows access to the first network, or information about whether the target area supports and/or allows access to the first network.

According to a third aspect, some embodiments of the present disclosure provide a network service control method, which is applied to a third communications device, and includes:
  determining whether a preset condition is met; and
  sending second information when it is determined that the preset condition is met, where the second information includes at least one of the following: second related information of a first service, second related information of a first network, or information about a first DNN.

According to a fourth aspect, an embodiment of the present disclosure provide a network service control method, which is applied to a fourth communications device, and includes:
  obtaining first information and/or second information; where
  the first information includes at least one of the following: first related information of a first service, first related information of a first network, information about a first DNN, area information of an allowed and/or supported area of the first DNN, service area information of a non-public network, information about whether a current area supports and/or allows the first service, information about whether a target area supports and/or allows the first service, information about whether the current area supports and/or allows access to the first network, or information about whether the target area supports and/or allows access to the first network; and
  the second information includes at least one of the following: second related information of the first service, second related information of the first network, or the information about the first DNN; and
  performing at least one of a second related operation of the first service, a second related operation of the first DNN, or a second related operation of the first network based on the first information and/or the second information.

According to a fifth aspect, some embodiments of the present disclosure provide a first communications device, including:
  an obtaining module, configured to obtain first information, where the first information includes at least one of the following: first related information of a first service, first related information of a first network, information about a first DNN, area information of an allowed and/or supported area of the first DNN, network description information of a non-public network, area information of a service area of the non-public network, information about whether a current area supports and/or allows the first service, information about whether a target area supports and/or allows the first service, information about whether the current area supports and/or allows access to the first network, or information about whether the target area supports and/or allows access to the first network; and
  an execution module, configured to perform at least one of a first related operation of the first service, a first related operation of the first DNN, or a first related operation of the first network based on the first information.

According to a sixth aspect, some embodiments of the present disclosure provide a second communications device, including:

a sending module, configured to send first information, where the first information includes at least one of the following: first related information of a first service, first related information of a first network, information about a first DNN, area information of an allowed and/or supported area of the first DNN, network description information of a non-public network, area information of a service area of the non-public network, information about whether a current area supports and/or allows the first service, information about whether a target area supports and/or allows the first service, information about whether the current area supports and/or allows access to the first network, or information about whether the target area supports and/or allows access to the first network.

According to a seventh aspect, some embodiments of the present disclosure provide a third communications device, including:

a determining module, configured to determine whether a preset condition is met; and a sending module, configured to send second information when it is determined that the preset condition is met, where the second information includes at least one of the following: second related information of a first service, second related information of a first network, or information about a first DNN.

According to an eighth aspect, some embodiments of the present disclosure provide a fourth communications device, including:

an obtaining module, configured to obtain first information and/or second information; where the first information includes at least one of the following: first related information of a first service, first related information of a first network, information about a first DNN, area information of an allowed and/or supported area of the first DNN, service area information of a non-public network, information about whether a current area supports and/or allows the first service, information about whether a target area supports and/or allows the first service, information about whether the current area supports and/or allows access to the first network, or information about whether the target area supports and/or allows access to the first network;

the second information includes at least one of the following: second related information of the first service, second related information of the first network, or the information about the first DNN; and an execution module, configured to perform at least one of a second related operation of the first service, a second related operation of the first DNN, or a second related operation of the first network based on the first information and/or the second information.

According to a ninth aspect, some embodiments of the present disclosure provide a communications device, where the communications device includes a processor, a memory, and a computer program that is stored in the memory and that can run on the processor, and when the computer program is executed by the processor, steps of the network service control method according to the first aspect are implemented, or steps of the network service control method according to the second aspect are implemented, or steps of the network service control method according to the third aspect are implemented, or steps of the network service control method according to the fourth aspect are implemented.

According to a tenth aspect, some embodiments of the present disclosure further provide a non-transitory computer-readable storage medium, where the non-transitory computer-readable storage medium stores a computer program, and when the computer program is executed by a processor, steps of the network service control method according to the first aspect are implemented, or steps of the network service control method according to the second aspect are implemented, or steps of the network service control method according to the third aspect are implemented, or steps of the network service control method according to the fourth aspect are implemented.

It may be understood that, based on the embodiments of the present disclosure, different service area requirements of different first services can be distinguished. Therefore, access to the first service through an allowed second network can be supported, and in addition, it can be controlled not to access the first service through an unallowed second network. In one aspect, a service area of a network service is extended, and in another aspect, privacy and security requirements of the network service are ensured.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DESCRIPTION OF EMBODIMENTS

Figure 1:
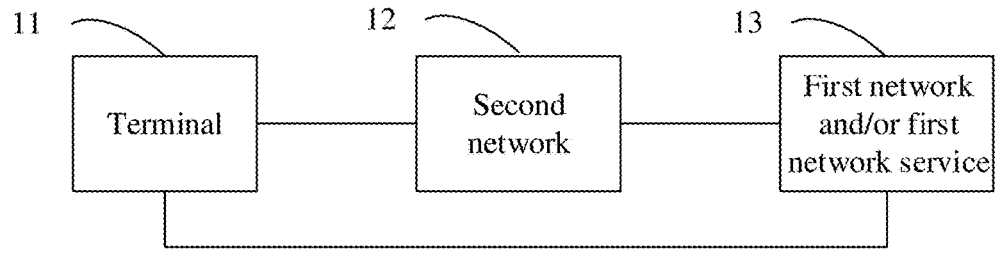
FIG. 1 is a schematic structural diagram of an applicable network system according to some embodiments of the present disclosure.

First, it is noted that a network service may include a network service and a network feature of an application layer. A type-A network service needs to be accessed after a data channel is established for a terminal in an access network. For a type-B network service, there is no need to establish a data channel for the terminal.

The type-A network service may include but is not limited to IMS voice, a local area network (LAN) service, MBMS, PWS (Public Warning System), and a location service on a user plane.

The type-B network service may include but is not limited to: circuit switched fallback (CSFB), fallback to evolved packet system (EPS), that is EPSFB, and Short Messaging Service (SMS).

Generally, the network service can be accessed only by accessing a network that provides the network service. A non-public network (referred to as a non-public network for short) may have multiple deployment manners, for example, (1) an independent network; (2) a non-independent network, for example, (a) is a part of an operator communications network, and (b) is a slice of the operator communications network.

With the introduction of the non-public network (referred to as a non-public network for short), one non-public network usually provides services within only one area, for example, a factory or an office building, and is not full coverage. When a subscribed terminal of the non-public network moves out of a service range of the non-public network, a network service of the non-public network (referred to as a non-public network service for short) cannot be accessed. If the terminal subscribes to a public network at the same time, the terminal can access the non-public network service through the public network.

For the type-A network service, (1) the terminal can access the public network service through the non-public network, which means that the terminal can simultaneously establish a protocol data unit (PDU) session of a public network service and a PDU session of the non-public network service in the non-public network. (2) The terminal can access the non-public network service through the public network, which means that the terminal can simultaneously establish a PDU session of the public network service and a PDU session of the non-public network service in the public network.

For the type-B network service, when the terminal requests to access the first service through a second network, the second network needs to verify whether the terminal is allowed to access the first service through the second network.

Similarly, although the public network (referred to as a public network for short) is full coverage, there are still some blind areas. If these blind areas happen to have non-public network coverage, and a terminal that subscribes to the public network subscribes to the non-public network at the same time, the public network service may be accessed through the non-public network.

To support access to a network service of a network through another network, the following problems need to be resolved:

Problem 1: not all non-public network services can be accessed through another network. Similarly, not all public network services can be accessed through another network, for example, some network services with relatively high security and privacy. However, currently, there is no way to distinguish which network services are isolated.

Problem 2: it is unclear how to access the non-public network service through the public network. It is also unclear how to access the public network service through the non-public network. Currently, (a) it is unclear which public network services are allowed to be accessed through the non-public network and which non-public networks are allowed to be used for access; (b) in a specific public network, it is unclear which public network services are allowed to be accessed through the non-public network and which public network services are not allowed to be accessed through the non-public network; (c) it is unclear which public network services of which non-public networks are allowed to be accessed through the public network and which public networks are allowed to be used for access; (d) in a specific non-public network, it is unclear which non-public network services are allowed to be accessed through the public network and which non-public network services are not allowed to be accessed through the public network.

An allowed area of the public network service and an allowed area of the non-public network service are usually different. Currently, a session management function (SMF) is verified during service verification PDU session establishment verification. As a terminal moves, the SMF needs to distinguish between a PDU session of the public network service and a PDU session of the non-public network service, to determine operations of different PDU sessions.

Problem 3: for the type-A network service, related data of the network service needs to be transmitted through an established data channel. It is not difficult to understand that access to the network service can be controlled by controlling a data channel of the network service. Currently, an SMF is verified during service PDU session establishment verification. As the terminal moves, the SMF needs to distinguish PDU sessions required by different allowed areas, to determine operations of different PDU sessions.

An allowed area of a PDU session of the public network service and an allowed area of a PDU session of the non-public network service may be different. Allowed areas of PDU sessions of different public network services may be different. Allowed areas of PDU sessions of different non-public network services may be different.

Problem 4: for the type-B network service, a current access network of the terminal needs to control whether the terminal accesses a service of another network. Another network service allowed by the current network is unclear. In addition, the same network service may be provided by multiple other networks. A service of another network that is accessed by the terminal is unclear.

Problem 5: when the non-public network is not independently deployed, a service area of the non-public network may not be all service ranges of a public network that supports the non-public network. When the terminal moves out of a service range of the non-public network, but a non-public network service is not allowed to be accessed through another network, a PDU session of the non-public network service may need to be released and suspended. The terminal cannot request to activate the PDU session of the non-public network service in a service area of the non-public network. Currently, the SMF and the terminal still lack information about the service area of the non-public network.

Optionally, obtaining may be understood as obtaining from a configuration, obtaining through receiving, obtaining after receiving by using a request, obtaining through self-learning, obtaining through derivation based on information that is not received, or obtaining after processing based on received information. This may be specifically determined based on an actual requirement, and is not limited in the embodiments of the present disclosure. For example, when specific capability indication information sent by a device is not received, it may be deduced that the device does not support the capability.

Optionally, sending may include broadcasting, broadcasting in a system message, and returning after responding to a request.

In the embodiments of the present disclosure, a registration request may include one of the following: an attach request, a location update request, a mobile registration request, and an initial registration request.

In the embodiments of the present disclosure, a de-registration request may include one of the following: a de-attach request.

In the embodiments of the present disclosure, a non-public network service is short for a non-public network service. The non-public network service may also be referred to as one of the following: a network service of a non-public network, a non-public communication service, a non-public network communication service, a network service of a non-public network, or another name. It should be noted that a naming manner is not specifically limited in the embodiments of the present disclosure. In an implementation, the non-public network is a closed access group (Closed Access Group, CAG), and in this case, the non-public network service is a network service of the closed access group.

In the embodiments of the present disclosure, the non-public network service may include or be referred to as a private network service. The private network service may be referred to as one of the following: a network service of a private network, a private communication service, a private network service, a private network service, a local area network (LAN) service, a private virtual network (PVN) service, an isolated communication network service, a dedicated communication network service, a dedicated network service, or another name. It should be noted that a naming manner is not specifically limited in the embodiments of the present disclosure.

In the embodiments of the present disclosure, a non-public network is short for a non-public network. The non-public network may be referred to as one of the following: a public communication network. The non-public network may include at least one of the following deployment manners: a physical non-public network, a virtual non-public network, or a non-public network implemented in the public network. In an implementation, the non-public network is a closed access group (CAG). One CAG may include a group of terminals.

In the embodiments of the present disclosure, the non-public network may include or be referred to as a private network. The private network may be referred to as one of the following: a private communication network, a private network, a local area network (LAN), a private virtual network (PVN), an isolated communication network, a dedicated communication network, or another name. It should be noted that a naming manner is not specifically limited in the embodiments of the present disclosure.

In the embodiments of the present disclosure, a public network service is short for a public network service. The public network service may also be referred to as one of the following: a network service of a public network, a public communication service, a public network communication service, a network service of a public network, or another name. It should be noted that a naming manner is not specifically limited in the embodiments of the present disclosure.

In the embodiments of the present disclosure, a public network is short for a public network. The public network may be referred to as one of the following: a public communication network or another name. It should be noted that a naming manner is not specifically limited in the embodiments of the present disclosure.

In the embodiments of the present disclosure, a DNN (Data Network Name, data network name) may be referred to as one of the following: an APN (Access Point Name, access point name) or another name. It should be noted that a naming manner is not specifically limited in the embodiments of the present disclosure.

In the embodiments of the present disclosure, the allowed area may include at least one of the following areas: an area indicated by area information of the allowed area, an area outside an area indicated by area information of an unallowed area, or an area outside an area indicated by area information of a forbidden area. The unallowed area may include at least one of the following areas: an area outside the area indicated by the area information of the allowed area, the area indicated by the area information of the unallowed area, or the area indicated by the area information of the forbidden area.

In the embodiments of the present disclosure, the allowed area may be a supported area. The supported area may be an allowed area or an unallowed area, and this depends on whether subscription information and/or terminal policy information of a terminal are/is allowed. The unallowed area may include an unsupported area.

It should be noted that, the phrase "A and/or B" includes the following three combinations: only A, only B, and a combination of A and B.

In the embodiments of the present disclosure, the data channel includes at least one of the following: a PDU session, a packet data network (PDN) connection, a quality of service (QoS) flow, an EPS bearer, packet data protocol (PDP) context, or a data radio bearer (DRB).

In the embodiments of the present disclosure, the current area may include at least one of the following: a network (for example, a second network or a first network accessed through the second network) currently accessed by the terminal, a location area list (for example, a tracking area identity (TAI) list) configured for the terminal by a core network (CN) network element (for example, an access and mobility management function (AMF)), or an area (for example, a tracking area (TA), a cell, or a radio access network (RAN) network element) on which the terminal currently camps.

In the embodiments of the present disclosure, the target area may include at least one of the following: a target network to which the terminal is handed over, a network requested to access (for example, a second network requested to access and/or a first network requested to access through the second network), or an area (for example, a TA, a cell, or a RAN network element) that the terminal requests to access. In the embodiments of the present disclosure, the network service may include or be referred to as a network feature. The network feature may include at least one of the following: a fifth generation system (5GS) network feature or an EPS network feature.

The 5GS network feature may include but is not limited to at least one of the following:

a public warning system (PWS), a location service (LCS), an internet protocol (IP) multimedia service (for example, IP multimedia subsystem (IMS) voice by using a packet service (PS) session, IMS VoPS (IMS voice over PS session indicator (IMS VoPS)), a short messaging service (for example, short messaging service over non-access stratum (NAS), SMS over NAS), an application triggering service, a local area data network (LADN), a mobile initiated connection only (MICO), a LAN service, an MPS multimedia priority service (MPS), an emergency service (for example, emergency service support for non-3GPP access indicator (EMCW), or emergency service fallback indicator for 3GPP access), interworking without N26 interface (Interworking without N26 interface), a multimedia broadcast multicast service (MBMS), a control plane cellular internet of thing (CP CIOT), or a user plane cellular internet of thing (UP CIOT).

The EPS network feature may include but is not limited to at least one of the following: CP CIOT (control plane CIOT), header compression for HC-CP CIOT (header compression for control plane CIOT), EPS optimization, UP CIOT (user plane CIOT), registration without PDN connection establishment (ERw/oPDN (EMM-REGISTERED without PDN connection)), an extended service request (EXTENDED SERVICE REQUEST for packet services (ESRPS)), a location service (for example, S (Location services in CS (CS-LCS)), (Location services indicator in EPC (EPC-LCS)), an emergency bearer (EMC BS (Emergency bearer services)), dual connectivity with NR (dual connectivity with NR), enhanced coverage (enhanced coverage), extended protocol configuration (ePCO (the extended protocol configuration options), S1-U data transfer (S1-u data transfer), or MBMS.

In the embodiments of the present disclosure, the first service/the first network is short for the first service and/or the first network, and the first network/the first service is short for the first network and/or the first service.

In the embodiments of the present disclosure, allowed/supported is short for allowed and/or supported, and supported/allowed is short for supported and/or allowed.

In the embodiments of the present disclosure, the area may be described by using, but not limited to, at least one of the following: a network, a TA (Tracking Area), a RAN notification area (RNA), a cell, all cells of a RAN network element, a location area, a tracking area, a service area, or a routing area. The area is, for example, an allowed area, an unallowed area, a forbidden area, a current area, and/or a target area.

In the embodiments of the present disclosure, the area information may include at least one of the following: network identifier information, TA identifier information, RNA identifier information, cell identifier information, RAN network element identifier information, tracking area identifier information, service area identifier information, or routing area identifier information.

In the embodiments of the present disclosure, the communications device includes at least one of the following: a terminal or a network element.

In the embodiments of the present disclosure, the network element may be at least one of the following: a physical device, a network functional entity, a network unit, or a network side network element.

In the embodiments of the present disclosure, the network side network element may include at least one of the following: a RAN (Radio Access Network, radio access network) network element or a CN (core network) network element.

In the embodiments of the present disclosure, the core network network element (the CN network element) may include but is not limited to at least one of the following: a core network device, a core network node, a core network function, a core network network element, a mobility management entity (MME), an access management function (AMF), a session management function (SMF), a user plane function (UPF), a serving gateway (SGW), a PDN gateway, a policy control function (PCF), a policy and charging rules function (PCRF) unit, a serving GPRS support node (SGSN), a gateway GPRS support node (GGSN), or a radio access network device.

In the embodiments of the present disclosure, the radio access network network element (the RAN network element) may include but is not limited to at least one of the following: a radio access network device, a radio access network node, a radio access network function, a radio access network unit, a third generation partnership project (3GPP) radio access network, a non-3GPP radio access network, a centralized unit (CU), a distributed unit (DU), a base station, an evolved NodeB (eNB), a 5G base station (gNB), a radio network controller (RNC), a NodeB (NodeB), a non-3GPP interworking function (N3IWF), an access control (Access Controller, AC) node, an access point (AP) device, or a wireless local area network (WLAN) node.

The base station may be a base transceiver station (BTS) in GSM or CDMA, or may be a NodeB in WCDMA, or may be an evolved NodeB (eNB or e-NodeB, evolutional Node B) and a 5G base station (gNB) in LTE. This is not limited in the embodiments of the present disclosure.

In the embodiments of the present disclosure, the network side network element may include at least one of the following: a CN network element or a RAN network element.

In the embodiments of the present disclosure, the terminal may include a relay that supports a terminal function and/or a terminal that supports a relay function. The terminal may also be referred to as a terminal device or user equipment (UE). The terminal may be a terminal side device such as a mobile phone, a tablet personal computer, a laptop computer, a personal digital assistant (PDA), a mobile internet device (MID), a wearable device, or an in-vehicle device. It should be noted that a specific type of the terminal is not limited in the embodiments of the present disclosure.

In the embodiments of the present disclosure, it should be noted that a capability signaling optimization capability of the terminal and another terminal capability are independently defined capability information elements (IE). The terminal reports the capability signaling optimization capability, and the network may determine, based on the capability signaling optimization capability, whether to allocate capability identifier information or whether to obtain capability identifier information from the terminal.

How to support the non-public network and how to provide a non-public network service and a public network service for user terminals are technical problems that need to be urgently resolved currently.

Referring to FIG. 1, FIG. 1 is a schematic structural diagram of an applicable network system according to some embodiments of the present disclosure. As shown in FIG. 1, the network system includes a terminal 11, a second network 12, a first network, and/or a first network service 13. The first network service may be a network service supported by a network element of the first network or a network service accessed through the first network. The terminal 11 may access the first network service through the second network 12, may access the first network service through the first network, or may access the first network service through the first network after accessing the first network through the second network.

The following describes the network service control method in the embodiments of the present disclosure.

Figure 2:
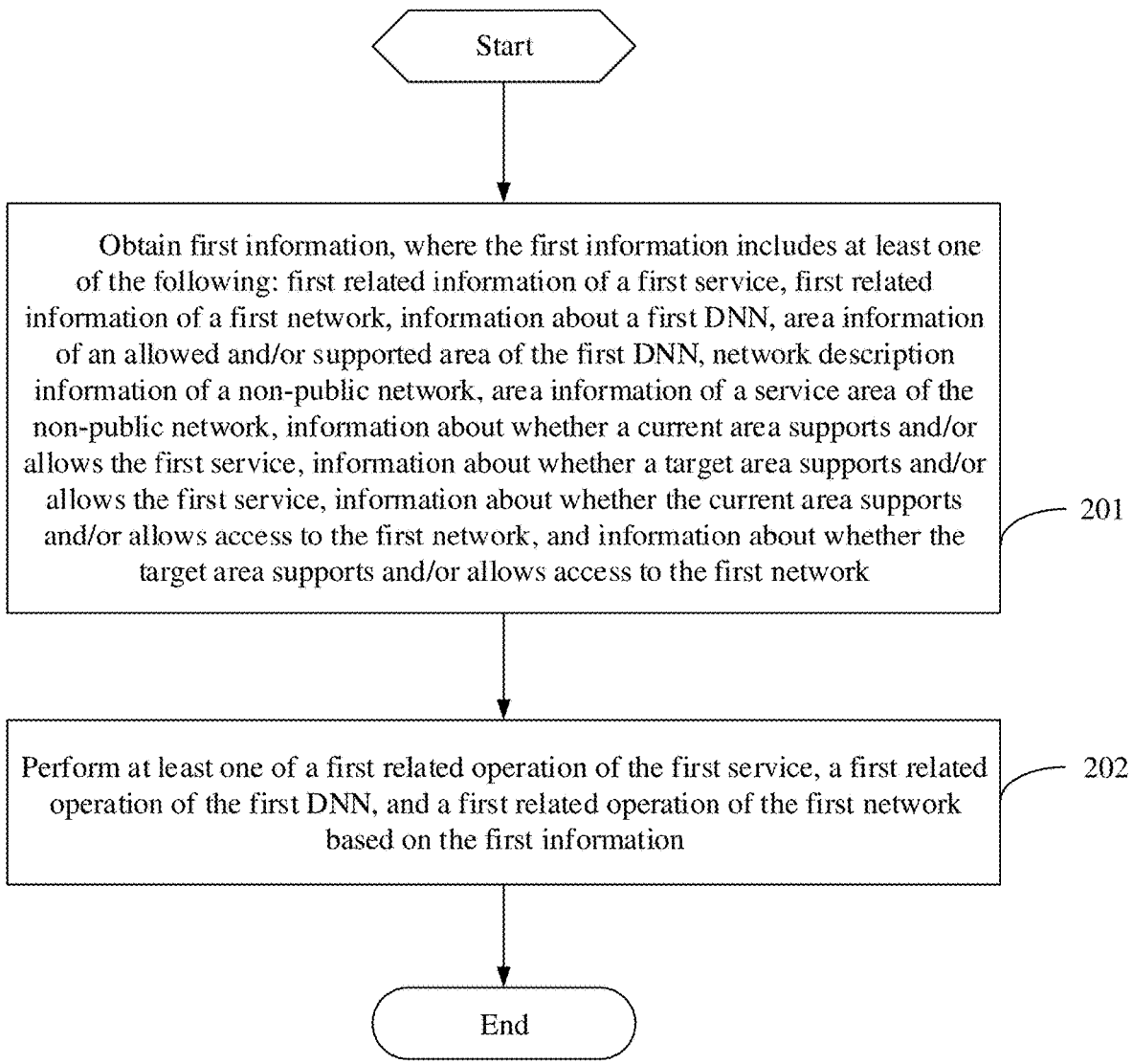
FIG. 2 is a flowchart of a network service control method according to some embodiments of the present disclosure.

Referring to FIG. 2, FIG. 2 is a flowchart of a network service control method according to some embodiments of the present disclosure. The network service control method in this embodiment may be applied to a first communications device. The first communications device may include but is not limited to at least one of the following: a terminal (which may include a terminal having a relay function and/or a relay having a terminal capability), a RAN network element, or a CN network element. As shown in FIG. 2, the network service control method includes the following steps.

Step 201: obtaining first information, where the first information includes at least one of the following:
  first related information of a first service, first related information of a first network, information about a first data network name DNN, area information of an allowed and/or supported area of the first DNN, network description information of a non-public network, area information of a service area of the non-public network, information about whether a current area supports and/or allows the first service, information about whether a target area supports and/or allows the first service, information about whether the current area supports and/or allows access to the first network, or information about whether the target area supports and/or allows access to the first network.

Step 202: performing at least one of a first related operation of the first service, a first related operation of the first DNN, or a first related operation of the first network based on the first information.

In some examples, the first service may be a network service of the first network. The first service may be one or more network services.

In some examples, a network type of the first network may be a public network or a non-public network. In some examples, a network type of a second network may include at least one of the following: a public network, a non-public network, or a public network that supports a non-public network.

In some examples, the first network may be further differentiated into at least one of the following: a first public network or a first non-public network. When the first network is a first public network, the second network may include at least one of the following: a non-public network or a second public network. When the first network is a first non-public network, the second network may include at least one of the following: a second non-public network or a public network.

In some examples, the first service may be further differentiated into at least one of the following: a first public network service or a first non-public network service. The first public network service may be one or more network services in network services of the first public network. The first non-public network service may be one or more network services in network services of the first non-public network.

In some examples, the first information may be obtained from a network element at a first source end. The first source end may include at least one of the following: the first network, the second network, the public network, the non-public network, or a public network that supports the non-public network.

In an implementation, the first communications device is a terminal. When the terminal initiates an access request (the access request is, for example, an attach request, a registration request, a location update request, and/or a tracking area update (TAU) request) to the first source end, the terminal obtains the first information from access acceptance returned by the first source end (the access acceptance is, for example, attach acceptance, registration acceptance, location update acceptance, and/or TAU acceptance). The first communications device is a RAN network element, and may obtain the first information from an AMF. Subsequently, the RAN network element may forward the first information to the terminal. When switching between RAN network elements, a target RAN network element may obtain the first information from a source RAN network element.

The network element at the first source end may include at least one of the following: a RAN network element (for example, a gNB and/or an eNB) or a CN network element (for example, an AMF, a UDM, an SMF, a PCF, and/or an MME). For example, when the first communications device is a terminal, the first information may be obtained from the CN network element or the RAN network element.

In an implementation, the first information is obtained from a network element of the first network. In another implementation, the first information is obtained from a network element of the second network. In this implementation, the first related information that is of the first service and that is obtained from the network element of the second network may be first related information of the first service, access to which through the second network is allowed and/or supported. In this implementation, the first related information that is of the first network and that is obtained from the network element of the second network may be first related information of the first network, access to which through the second network is allowed and/or supported.

Optionally, the first related information of the first network includes at least one of the following:
  network description information of the first network;
  information about whether the terminal is allowed to access the first network;
  information about whether the terminal is allowed to access the first network through the second network;
  information about whether access to the first network is supported;
  information about whether access to the first network through the second network is supported;
  area information of an area in which access to the first network is allowed;
  network description information of the second network in which access to the first network is allowed;
  information about whether the current area (which may include a current network) allows the terminal to access the first network;

information about whether the target area (which may include a target network such as a handed-over target network) allows the terminal to access the first network;

DNN information of the first network; or slice information of the first network.

In some examples, the DNN information of the first network may include at least one of the following: DNN information of the second network, where the DNN is used to access the first network; DNN information of the first network, where the DNN is used to access the first network; or DNN information of the first network, where the DNN is used to access the first network through the second network.

In some examples, the slice information of the first network may include at least one of the following: slice information of the second network, used to access the first network; slice information of the first network, used to access the first network; or slice information of the first network, where the slice is used to access the first network through the second network.

In some examples, whether access to the first network is supported may indicate whether both the terminal and a currently accessed network support access to the first network through the second network. In an implementation, when obtaining, from the second network, whether access to the first network through the second network is supported, whether access to the first network through the second network is supported may indicate whether both the terminal and the second network support access to the first network through the second network. In another implementation, when obtaining, from the first network, whether access to the first network through the second network is supported, whether access to the first network through the second network is supported may indicate whether both the terminal and the first network support access to the first network through the second network.

In some examples, the first related information of the first network may further include at least one of the following: area information of an area in which access to the first network is not allowed, or area information of an area in which access to the first network is forbidden. An area outside an area indicated by the area information of the area in which access to the first network is not allowed and/or the area information of the area in which access to the first network is forbidden may be understood as an area in which access to the first network is allowed.

Optionally, the first related information of the first service includes at least one of the following:

network service description information of the first service;

network description information of the first network that provides the first service;

information about whether the terminal is allowed to access the first service;

information about whether the terminal is allowed to access the first service through the second network;

information about whether access to the first service is supported;

information about whether access to the first service through the second network is supported;

area information of an area in which access to the first service is allowed (which may include a network in which access to the first service is allowed);

network description information of the second network in which access to the first service is allowed;

information about whether the current area allows the terminal to access the first service;

information about whether the target area (which may include a target network such as a handed-over target network) allows the terminal to access the first service;

DNN information of the first service; or slice information of the first service.

In some examples, the DNN information of the first service may include at least one of the following: DNN information of the second network, where the DNN is used to access the first service; DNN information of the first network, where the DNN is used to access the first service; or DNN information of the first network, where the DNN is used to access the first service through the second network.

In some examples, the slice information of the first service may include at least one of the following: slice information of the second network, where the slice is used to access the first service; slice information of the first network, where the slice is used to access the first service; or slice information of the first network, where the slice is used to access the first service through the second network.

In an implementation, whether access to the first service is supported may indicate whether both the terminal and a currently accessed network support access to the first service through the second network. In an implementation, when obtaining, from the second network, whether access to the first service through the second network is supported, whether access to the first service through the second network is supported may indicate whether both the terminal and the second network support access to the first service through the second network. In another implementation, when obtaining, from the first network, whether access to the first service through the second network is supported, whether access to the first service through the second network is supported may indicate whether both the terminal and the first network support access to the first service through the second network.

In an implementation, the first related information of the first service may further include at least one of the following: area information of an area in which access to the first service is not allowed, or area information of an area in which access to the first service is forbidden. An area outside an area indicated by the area information of the area in which access to the first service is not allowed and/or the area information of the area in which access to the first service is forbidden may be understood as an area in which access to the first service is allowed.

In some examples, the network description information may include at least one of the following: information indicating whether a network is an isolated network, network identifier information, network type information, information about an operation body (for example, an operator) of the network, DNN information, or slice information. In some examples, the network identifier information may include at least one of the following: network identifier information of a non-public network or network identifier information of a public network. In some examples, the network type information may include at least one of the following: a non-public network, a public network, or a public network that supports a non-public network. In some examples, the network identifier information may include at least one of the following: network identifier information of a non-public network or network identifier information of a public network. In some examples, the network type information may include at least one of the following: a non-public network, a public network, or a public network that supports a non-public network.

In some examples, the network description information of the non-public network may include at least one of the following: information indicating whether a network is an isolated network, identifier information of the non-public network, network type information being the non-public network, information about an operation body (for example, a factory) of the network, DNN information, or slice information. In some examples, the network description information of the public network may include at least one of the following: information indicating whether a network is an isolated network, identifier information of the public network, network type information being the public network, information about an operation body (for example, an operator) of the network, DNN information, or slice information.

In an implementation, when the first network is an isolated network service and the first service is a network service of the first network, at least one of the following may be indicated: the first network does not support/does not allow interworking with another network, or the first network does not support/does not allow access through another network.

In some examples, the network service description information may include at least one of the following: information indicating whether the network service is an isolated network service, network service identifier information, network service name information, corresponding application information, or network service type information. In some examples, the network identifier information may include at least one of the following: non-public network identifier information or public network identifier information. In some examples, the network service type information may include at least one of the following: a non-public network service or a public network service.

In an implementation, when the first service is an isolated network service, it may indicate that the first service is only allowed to be accessed through the first network and/or the first service is not allowed to be accessed through another network.

It is not difficult to understand that the network service description information of the first service may include at least one of the following: information indicating whether the first service is an isolated network service, network service identifier information of the first service, network service name information of the first service, application information corresponding to the first service, or a network service type of the first service. When the first service is a non-public network, the first network is a non-public network, the network service identifier information of the first service is non-public network service identifier information, and the network service type information of the first service is a non-public network service. When the first service is a public network, the first network is a public network, the network service identifier information of the first service is public network service identifier information, and the network service type information of the first service is a public network service.

In an implementation, when the network allows access to the first service/the first network, not all areas of the network allow access to the first service/the first network. In a network in which access to the first service/the first network is allowed, an area in which access to the first service/the first network is allowed, an area in which access to the first service/the first network is not allowed, and an area in which access to the first network/the first network is forbidden may be further distinguished.

In an implementation, that access to the first service/the first network is not allowed and that access to the first service/the first network is forbidden are the same in meaning. In another implementation, that access to the first service/the first network is not allowed and that access to the first service/the first network is forbidden are different in meaning. That access to the first service is forbidden may mean that neither terminal originating nor terminal terminating is allowed. That the first service/the first network is not allowed may mean that terminal originating is not allowed but terminal terminating is allowed. It is not difficult to understand that in this implementation, when access to the first service/the first network is not allowed, the terminal may not request the first service/the first network from the network. However, the network may send related information of the first service/the first network to the terminal (for example, push a new version or update a policy of the first service).

In some examples, the area (which may be referred to as a first network-allowed area for short) in which access to the first network is allowed includes a network in which access to the first network is allowed.

In some examples, the area (which may be referred to as a first service-allowed area for short) in which access to the first service is allowed includes a network in which access to the first service is allowed.

In some examples, the area information of the allowed area of the first network includes at least one of the following: network description information of a network that allows access to the first network, or area identifier information of an area (for example, a TA, a cell, and a RAN network element) that allows access to the first network.

In some examples, the area information of the unallowed area of the first network includes at least one of the following: network description information of a network that does not allow access to the first network, or area identifier information of an area that does not allow access to the first network.

In some examples, the area information of the forbidden area of the first network includes at least one of the following: network description information of a network that forbids access to the first network, or area identifier information of an area that forbids access to the first network.

In some examples, the area information of the allowed area of the first service includes at least one of the following: network description information of a network that allows access to the first service, or area identifier information of an area that allows access to the first service.

In some examples, the area information of the unallowed area of the first service includes at least one of the following: network description information of a network that does not allow access to the first service, or area identifier information of an area that does not allow access to the first service.

In some examples, the area information of the forbidden area of the first service includes at least one of the following: network description information of a network that forbids access to the first service, or area identifier information of an area that forbids access to the first service.

Optionally, the information about the first DNN includes at least one of the following: a DNN.

Optionally, the first DNN may be a DNN of the first network or a DNN of the second network.

In some examples, the DNN of the first network may be a DNN of a data channel of the first network, and the data channel of the first network is allowed to be established through the second network. When the first DNN is the DNN of the first network, an area allowed by the first DNN may include the allowed second network. Area information of the area allowed by the first DNN may include identifier information of the allowed second network.

In some examples, the DNN of the second network may be a DNN of a data channel of the second network, and it is allowed to access the first network through the data channel of the second network. When the first DNN is the DNN of the second network, an area allowed by the first DNN may include the allowed first network. Area information of the area allowed by the first DNN may include identifier information of the allowed first network.

In an implementation, the information about the first DNN and/or the area information of the area that is allowed and/or supported by the first DNN may be included in a terminal policy (for example, URSP (UE Route Selection Policy)).

In some examples, before the step of obtaining the first information, at least one of the following may be sent: request information of first service information or request information of first network information.

In some examples, the request information of the first service information may be used to request the first related information of the first service and/or the first related information of the first network. The request information of the first network information may be used to request the first related information of the first service and/or the first related information of the first network.

In an implementation, the request information of the first service information is sent to the network element at the first source end. The first source end is described above, and details are not described herein again. The network element at the first source end is described above, and details are not described herein again.

In some examples, the request information of the first service information includes at least one of the following: indication information for obtaining the first service information, network description information of the first network, or network service description information of the first service In an implementation, the indication information for obtaining the first service may be used to request to obtain information about the supported and/or allowed first service and/or the first network that provides the first service. For example, the indication information of the first service is sent to the second network, and may be used to request to obtain information about the first service/the first network that is supported and/or allowed by the second network. In an implementation, the network description information of the first network may be used to request to obtain information about all indicated first services supported and/or allowed by the first network. In an implementation, the network service description information of the first service is used to obtain information about the first service indicated in the first network.

In some examples, the request information of the first network information includes at least one of the following: indication information for obtaining the first network information or the network description information of the first network.

Optionally, the information about whether the current area supports and/or allows the first network may include at least one of the following: the network description information of the first network or area information of the current area.

Optionally, the information about whether the target area supports and/or allows the first network may include at least one of the following: the network description information of the first network or area information of the target area.

Optionally, the information about whether the current area supports and/or allows the first service may include at least one of the following: the network description information of the first network, the service description information of the first service, or area information of the current area.

Optionally, the information about whether the target area supports and/or allows the first service may include at least one of the following: the network description information of the first network, the service description information of the first service, or area information of the target area.

The current area or the target area may be described by using at least one of the following: a network, a TA (Tracking Area), a RAN notification area (RNA), a cell, all cells of a RAN network element, a location area, a tracking area, a service area, or a routing area.

The area information may include at least one of the following: network identifier information, TA identifier information, RNA identifier information, cell identifier information, RAN network element identifier information, tracking area identifier information, service area identifier information, or routing area identifier information.

In some examples, the current area may include at least one of the following: a network (for example, a second network or a first network accessed through the second network) currently accessed by the terminal, a location area list (for example, a TAI list) configured for the terminal by a CN network element (for example, an AMF), or an area (for example, a TA, a cell, or a RAN network element) on which the terminal currently camps.

In some examples, the target area may include at least one of the following: a target network to which the terminal is handed over, a network requested to access (for example, a second network requested to access and/or a first network requested to access through the second network), or an area (for example, a TA, a cell, or a RAN network element) that the terminal requests to access.

In an implementation, when the CN network element (for example, the AMF) configures the TAI list for the terminal, indication information about whether the first service/the first network is supported may be sent. The indication information about whether the first service is supported may be used to indicate whether the first service and/or the first network are/is supported in an area indicated by the TAI list.

When the terminal requests to access the first network (for example, a first network registration request and a location update request of the first network), the terminal receives rejection and/or a rejection reason returned by the first network. The rejection reason may be at least one of the following: a first network requested to access is not supported and/or allowed, the current area does not support and/or does not allow the requested first network, or access to the requested first network through a current network is not supported and/or allowed.

When the terminal requests the first service (for example, requests to establish the data channel of the first service and requests to activate the data channel of the first service), the terminal receives rejection and/or a rejection reason returned by the first network. The rejection reason may be at least one of the following: the requested first service is not supported and/or allowed, the current area does not support and/or does not allow the requested first service, access to the requested first service through the current network is not supported and/or allowed, the first network requested to access is not supported and/or allowed, the current area does not support and/or does not allow the requested first network, or access to the requested first network through the current network is not supported and/or allowed.

In an implementation, when the terminal initiates a request (for example, a registration request and/or a location update request) for accessing the first network to the first network through the second network, the current area is an area of the second network currently accessed by the terminal.

Based on the rejection and/or the rejection reason, the terminal may include at least one of the following: information about whether the current area supports and/or allows the first service, or information about whether the current area supports and/or allows the first network. When the terminal requests, from the second network, to access a service of the first network/the first network, after being rejected, the terminal may learn that the second network does not support and/or does not allow access to the first network/the first service, or learn that a second network TA in which the terminal is located does not support and/or does not allow access to the first network/the first service.

Optionally, the performing the first related operation of the first service may include at least one of the following:
  determining whether to initiate a request for accessing the first service;
  determining whether to initiate a request for accessing the first service through a second network;
  determining whether to request to establish a data channel of the first service; or
  determining whether to request to activate the data channel of the first service.

In some examples, the data channel of the first service may include at least one of the following: accessing the first service through the data channel of the first network of the second network, or accessing the first service through the data channel of the second network.

In some examples, when a first condition is met, it may be determined that at least one of the following is performed: skipping initiating a request for accessing the first service; skipping initiating a request for accessing the first service through the second network; skipping requesting to establish a data channel of the first service; or skipping requesting to activate the data channel of the first service.

In some examples, when a second condition is met, it may be determined that at least one of the following can be performed and/or is performed: initiating a request for accessing the first service; initiating a request for accessing the first service through the second network; requesting to establish a data channel of the first service; or requesting to activate the data channel of the first service.

The foregoing determining that at least one of the following can be performed and/or is performed may be understood as including at least one of the following:
  determining that at least one of the following can be performed: initiating a request for accessing the first service; initiating a request for accessing the first service through the second network; requesting to establish a data channel of the first service; or requesting to activate the data channel of the first service;
  determining that at least one of the following is performed: initiating a request for accessing the first service; initiating a request for accessing the first service through the second network; requesting to establish a data channel of the first service; or requesting to activate the data channel of the first service; and
  determining that at least one of the following can be performed: initiating a request for accessing the first service; initiating a request for accessing the first service through the second network; requesting to establish a data channel of the first service; or requesting to activate the data channel of the first service; and
  determining that at least one of the following is performed: initiating a request for accessing the first service; initiating a request for accessing the first service through the second network; requesting to establish a data channel of the first service; or requesting to activate the data channel of the first service.

Optionally, the performing the first related operation of the first network may include at least one of the following:
  determining whether to initiate a request for accessing the first network;
  determining whether to request to access the first network through the second network;
  determining whether to request to establish a data channel of the first network; or
  determining whether to request to activate the data channel of the first network.

In some examples, the data channel of the first network may include at least one of the following: accessing the first network through the data channel of the first network of the second network, or accessing the first network through the data channel of the second network.

In some examples, when a first condition is met, it may be determined that at least one of the following is performed: skipping initiating a request for accessing the first network; skipping initiating a request for accessing the first network through the second network; skipping requesting to establish a data channel of the first network; or skipping requesting to activate the data channel of the first network.

In some examples, when a second condition is met, it may be determined that at least one of the following can be performed and/or is performed: initiating a request for accessing the first network; initiating a request for accessing the first network through the second network; requesting to establish a data channel of the first network; or requesting to activate the data channel of the first network.

Optionally, the performing the first related operation of the first DNN may include at least one of the following:
  determining whether to request to establish a data channel of the first DNN; or
  determining whether to request to activate the data channel of the first DNN.

In some examples, when a first condition is met, it may be determined that at least one of the following is performed: skipping requesting to establish a data channel of the first DNN; or skipping requesting to activate the data channel of the first DNN.

In some examples, when a second condition is met, it may be determined that at least one of the following can be performed and/or is performed: requesting to establish a data channel of the first DNN; or requesting to activate the data channel of the first DNN.

The first condition may include at least one of the following:
  the current area (for example, an area accessed by the terminal) of the terminal does not support and/or does not allow the first service and/or the first network;
  the target area (for example, a target area to which the terminal is handed over) of the terminal does not support and/or does not allow the first service and/or the first network;
  the terminal moves out of an area (which may include an allowed network) that is supported and/or allowed by the first service and/or the first network;
  the terminal is located in or moves into an area (which may include an unallowed network) that is not supported and/or not allowed by the first service and/or the first network;
  the first service and/or the first network do/does not support and/or do/does not allow access through the second network, and the current area of the terminal belongs to the second network;

the first service and/or the first network do/does not support and/or do/does not allow access through the second network, and the target area of the terminal belongs to the second network;

the first service is a non-public network service, the terminal moves out of a service area of a non-public network, and the non-public network service is an isolated network service;

the first service is a non-public network service, the terminal moves out of a service area of a non-public network, and the target area is not an area that is supported and/or allowed by the non-public network service;

the first service is a public network service, the terminal moves into a service area of a non-public network, and the non-public network is not an area that is supported and/or allowed by the public network service;

the current area of the terminal does not support and/or does not allow the first DNN;

the target area of the terminal does not support and/or does not allow the first DNN; or the terminal is located in or moves into an area (which may include an unallowed network) that is not allowed by the first DNN.

In an implementation, the foregoing area includes a network. It is not difficult to understand that the unallowed area includes an unallowed network, and the allowed area includes an allowed network.

In an implementation, that the non-public network service is an isolated network service may indicate that the non-public network service is only allowed to be accessed through a network that provides the non-public network service, and is not allowed to be accessed through another network.

In an implementation, that the terminal moves out of the service area of the non-public network includes: a target area that is accessed by the terminal and/or to which the terminal is handed over is located outside the service area of the non-public network. That the terminal moves into the service area of the non-public network includes: the target area that is accessed by the terminal or to which the terminal is handed over belongs to the service area of the non-public network.

In an implementation, that the terminal moves out of the area allowed by the first service includes: a target area that is accessed by the terminal and/or to which the terminal is handed over is located outside the area allowed by the first service.

The second condition includes at least one of the following:

the current area (for example, the area accessed by the terminal) of the terminal supports and/or allows the first service and/or the first network;

the target area (for example, the target area to which the terminal is handed over) of the terminal supports and/or allows the first service and/or the first network;

the terminal is located in or moves into an area (which may include an allowed network) supported and/or allowed by the first service and/or the first network;

the current area of the terminal belongs to the second network, and the first service and/or the first network support/supports and/or allow/allows access through the second network;

the target area of the terminal belongs to the second network, and the first service and/or the first network support/supports and/or allow/allows access through the second network;

the first service is a non-public network service and the terminal moves into a service area of a non-public network;

the first service is a non-public network service, the terminal moves out of a service area of a non-public network, and the target area is an area that is supported/allowed by the non-public network service;

the first service is a public network service, the terminal moves into a service area of a non-public network, and the service area of the non-public network is an area that is supported/allowed by the public network service;

the current area of the terminal supports and/or allows the first DNN;

the target area of the terminal supports and/or allows the first DNN; or the terminal is located in or moves into an area (which may include an allowed network) that is allowed by the first DNN.

In some examples, when the request of the first service is initiated, the data channel of the first service is requested to be established, and/or the data channel of the first service is requested to be activated, the related information of the first service is sent. In an implementation, the related information of the first service may be included in at least one of the following: a network service request message, a data channel establishment request message, a data channel activation request message, a NAS message that carries a network service request, a NAS message that carries a data channel establishment request, or a NAS message that carries a data channel activation request.

It should be noted that multiple optional implementations described in this embodiment of the present disclosure may be implemented in combination with each other, or may be separately implemented. This is not limited in this embodiment of the present disclosure.

Based on this embodiment of the present disclosure, different service area requirements of different first services can be distinguished. Therefore, access to the first service through an allowed second network can be supported, and in addition, it can be controlled not to access the first service through an unallowed second network. In one aspect, a service area of a network service is extended, and in another aspect, privacy and security requirements of the network service are ensured.

It is not difficult to understand that, for example, when the first network is a non-public network, a service area of the first network is a limited area (for example, an office building or a factory). When the second network is a public network, a service range (also referred to as a coverage range) of the second network is relatively large. Outside the service area of the non-public network, the non-public network service may be accessed by using a public network or another non-public network. For example, when the first network is a public network, there are also some blind service areas. If these blind areas are covered by non-public networks, the allowed public network service can be provided for the terminal. Therefore, outside the service area of the first network, the allowed first service may be provided for the terminal by using coverage of the second network. Both access to the public network service through the non-public network and access to the non-public network service through the public network can be supported. In another aspect, when the first service is only allowed to be accessed through the first network, for example, control may also be provided for a network service with relatively high privacy security, so that the terminal is prevented from performing access through an unallowed area.

Figure 3:
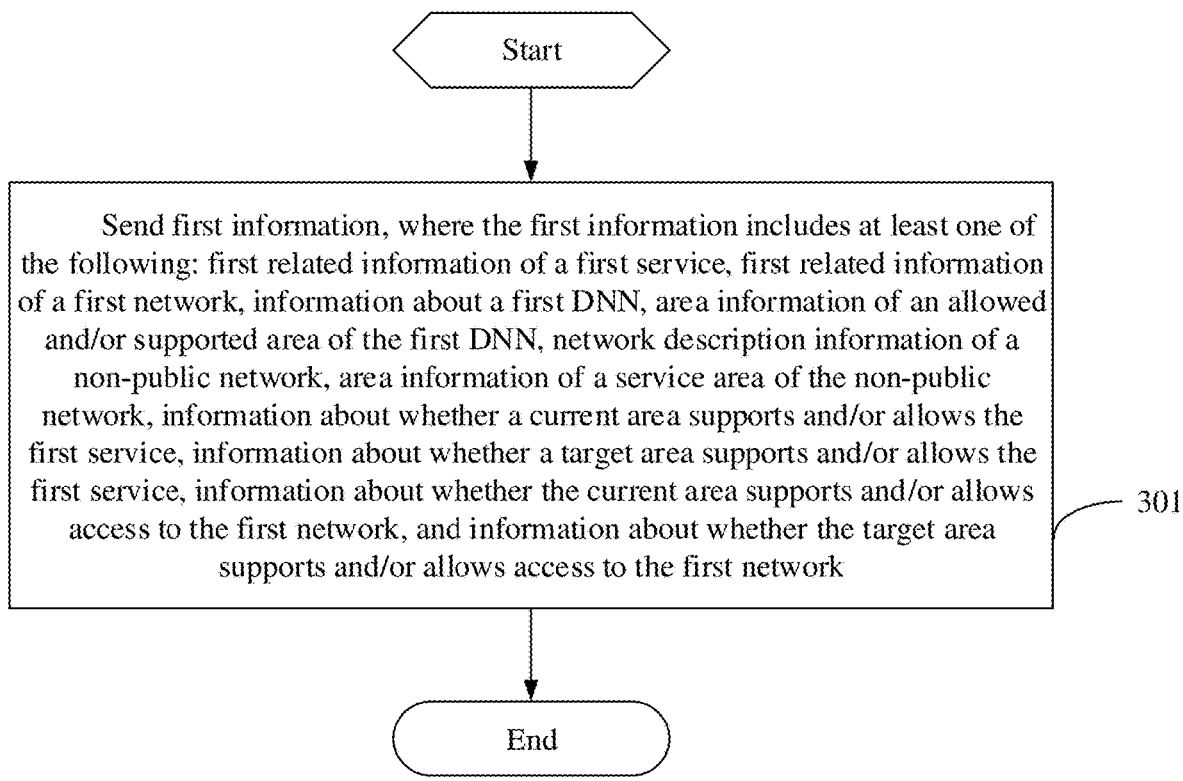
FIG. 3 is a flowchart of another network service control method according to some embodiments of the present disclosure.

Referring to FIG. 3, FIG. 3 is a flowchart of another network service control method according to some embodiments of the present disclosure. The network service control method in this embodiment may be applied to a second communications device, and the second communications device may include but is not limited to at least one of the following: a RAN network element (for example, a gNB or an eNB), or a CN network element (for example, an AMF, a UDM, an SMF, a PCF, and/or an MME). As shown in FIG. 3, the method includes the following steps.

Step 301: sending first information, where the first information includes at least one of the following:
first related information of a first service;
first related information of a first network;
first related information of a first DNN;
area information of an area allowed and/or supported by the first DNN;
network description information of a non-public network;
area information of a service area of the non-public network;
information about whether a current area supports and/or allows the first service;
information about whether a target area supports and/or allows the first service;
information about whether the current area supports and/or allows access to the first network; or
information about whether the target area supports and/or allows access to the first network.

In some examples, when a first preset condition is met, the first information is sent.

Optionally, the first preset condition may include at least one of the following:
request information of first service information is obtained;
request information of first network information is obtained;
first information is obtained;
the first information is determined; or
the first information is updated.

In some examples, the first service may be a network service of the first network. The first service may be one or more network services.

In some examples, a network type of the first network may be a public network or a non-public network. In some examples, a network type of a second network may include at least one of the following: a public network, a non-public network, or a public network that supports a non-public network.

In some examples, the first network may be further differentiated into at least one of the following: a first public network or a first non-public network. When the first network is a first public network, the second network may include at least one of the following: a non-public network or a second public network. When the first network is a first non-public network, the second network may include at least one of the following: a second non-public network or a public network.

In some examples, the first service may be further differentiated into at least one of the following: a first public network service or a first non-public network service. The first public network service may be one or more network services in network services of the first public network. The first non-public network service may be one or more network services in network services of the first non-public network.

In an implementation, when the terminal initiates an access request (the access request is, for example, an attach request, a registration request, a location update request, and/or a TAU request) to the second communications device, the second communications device sends the first information to access acceptance returned by the terminal (the access acceptance is, for example, attach acceptance, registration acceptance, location update acceptance, and/or TAU acceptance).

In some examples, the second communications device may be a network element of the first network and/or a network element of a second network. In an implementation, when the first network and the second network share a network element, the network element is both the network element of the first network and the network element of the second network.

The second communications device may send the second information to a first target end. The first target end may include at least one of the following: a terminal, a RAN network element (for example, a gNB and/or an eNB) or a CN network element (for example, an AMF, a UDM, an SMF, a PCF, and/or an MME).

For example, when the second communications device is an AMF, the first target end may include at least one of the following: a terminal, a RAN network element, or an SMF.

For example, when the second communications device is a UDM, the first target end may include at least one of the following: an AMF or an SMF.

For example, when the second communications device is a PCF, the first target end may include at least one of the following: an AMF or an SMF.

In an implementation, the first related information that is of the first service and that is sent by the network element of the second network may be first related information of the first service, access to which through the second network is allowed and/or supported. In an implementation, the first related information that is of the first network and that is sent by the network element of the second network may be first related information of the first network, access to which through the second network is allowed and/or supported.

Optionally, the first related information of the first service includes at least one of the following:
network service description information of the first service;
network description information of the first network that provides the first service;
information about whether the terminal is allowed to access the first service;
information about whether the terminal is allowed to access the first service through the second network;
information about whether access to the first service is supported;
information about whether access to the first service through the second network is supported;
area information of an area in which access to the first service is allowed (which may include a network in which access to the first service is allowed);
network description information of the second network in which access to the first service is allowed;
information about whether the current area allows the terminal to access the first service;
information about whether the target area (which may include a target network such as a handed-over target network) allows the terminal to access the first service;

DNN information of the first service; or slice information of the first service.

In some examples, the network service description information is described in the embodiment of FIG. 2, and details are not described herein again. In some examples, the network service identifier information is described in the embodiment of FIG. 2, and details are not described herein again. In some examples, the network service type information is described in the embodiment of FIG. 2, and details are not described herein again.

Optionally, the first related information of the first network includes at least one of the following:

network description information of the first network;

information about whether the terminal is allowed to access the first network;

information about whether the terminal is allowed to access the first network through the second network;

information about whether access to the first network is supported;

information about whether access to the first network through the second network is supported;

area information of an area in which access to the first network is allowed;

network description information of the second network in which access to the first network is allowed;

information about whether the current area (which may include a current network) allows the terminal to access the first network;

information about whether the target area (which may include a target network such as a handed-over target network) allows the terminal to access the first network;

DNN information of the first network; or slice information of the first network.

In some examples, the network description information is described in the embodiment of FIG. 2, and details are not described herein again. In some examples, the network identifier information is described in the embodiment of FIG. 2, and details are not described herein again. In some examples, the network type information is described in the embodiment of FIG. 2, and details are not described herein again.

In some examples, the network description information of the non-public network is described in the embodiment of FIG. 2, and details are not described herein again.

In some examples, the area information of the service area of the non-public network is described in the embodiment of FIG. 2, and details are not described herein again.

In some examples, the information about the first DNN is described in the embodiment of FIG. 2, and details are not described herein again.

In some examples, the area information of the area that is allowed and/or supported by the first DNN is described in the embodiment of FIG. 2, and details are not described herein again.

In an implementation, some first services are network services of the first network that is allowed to be accessed through the second network (a public network or another non-public network) (referred to as first services that are allowed to be accessed through the second network for short), and some other network services are network services of the first network that is not allowed to be accessed through the second network (a public network or another non-public network) (referred to as first services that are not allowed to be accessed through the second network for short). In this case, a DNN of the first service that is allowed to be accessed through the second network may be different from a DNN of the first service that is not allowed to be accessed through the second network. The multiple first services that are allowed to be accessed through the second network may have the same DNN. The multiple first services that are not allowed to be accessed through the second network may have the same DNN. The multiple first services with the same allowed area may have the same DNN.

In an implementation, some non-public network services are non-public network services that are allowed to be accessed through another network (for example, a public network or another non-public network) (referred to as non-public network services that are allowed to be accessed through another network), and some other non-public network services are non-public network services that are not allowed to be accessed through another network (for example, a public network or another non-public network) (referred to as non-public network services that are not allowed to be accessed through another network). A DNN of a non-public network service that is allowed to be accessed through another network may be different from a DNN of a non-public network service that is not allowed to be accessed through another network. The multiple non-public network services that are allowed to be accessed through another network may have the same DNN. The multiple non-public network services that are not allowed to be accessed through another network may have the same DNN. The multiple non-public network services with the same allowed area may have the same DNN.

In an implementation, some public network services are public network services that are allowed to be accessed through another network (for example, another public network or non-public network) (referred to as public network services that are allowed to be accessed through another network for short), and some other public network services are public network services that are not allowed to be accessed through another network (for example, another public network or non-public network) (referred to as public network services that are not allowed to be accessed through another network for short). A DNN of a public network service that is allowed to be accessed through another network may be different from a DNN of a public network service that is not allowed to be accessed through another network. The public network services that are allowed to be accessed through another network may have the same DNN. The multiple public network services that are not allowed to be accessed through another network may have the same DNN. The multiple public network services with the same allowed area may have the same DNN.

Based on this embodiment of the present disclosure, different service area requirements of different first services can be distinguished. Therefore, access to the first service through an allowed second network can be supported, and in addition, it can be controlled not to access the first service through an unallowed second network. In one aspect, a service area of a network service is extended, and in another aspect, privacy and security requirements of the network service are ensured.

Figure 4:
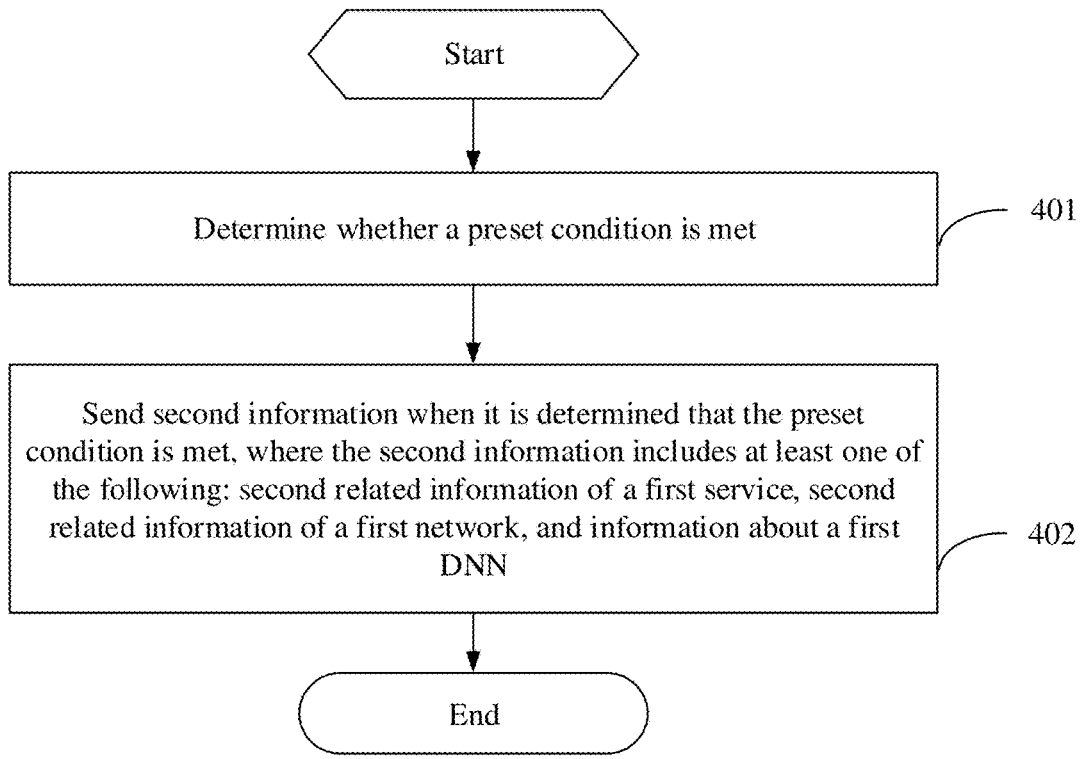
FIG. 4 is a flowchart of another network service control method according to some embodiments of the present disclosure.

Referring to FIG. 4, FIG. 4 is a flowchart of a network service control method according to some embodiments of the present disclosure. The network service control method in this embodiment may be applied to a third communications device. The third communications device may include but is not limited to at least one of the following: a terminal (which may include a terminal having a relay function and/or a relay having a terminal capability), a RAN network element, or a CN network element. As shown in FIG. 4, the network service control method includes the following steps.

Step 401: determining whether a preset condition is met.

Step 402: sending second information when it is determined that the preset condition is met, where the second information includes at least one of the following: second related information of a first service, second related information of a first network, or information about a first DNN.

In some examples, the second information may be sent to at least one of the following: a second network or the first network.

In some examples, the determining that the preset condition is met may include at least one of the following:

determining to initiate a request for accessing the first service;
determining to initiate a request for accessing the first service through the second network;
determining to request to establish a data channel of the first service;
determining to request to activate the data channel of the first service;
determining to initiate a request for accessing the first network;
determining to request to access the first network through the second network;
determining to request to establish a data channel of the first network;
determining to request to activate the data channel of the first network;
determining to request to establish a data channel of the first DNN; or
determining to request to activate the data channel of the first DNN.

In some examples, the third communications device and the first communications device are a same communications device. Before the step of sending the second information when it is determined that the preset condition is met, the third communications device may obtain first information. The first information may include at least one of the following: first related information of the first service, first related information of the first network, the information about the first DNN, area information of an allowed and/or supported area of the first DNN, network description information of a non-public network, area information of a service area of the non-public network, information about whether a current area supports and/or allows the first service, information about whether a target area supports and/or allows the first service, information about whether the current area supports and/or allows access to the first network, or information about whether the target area supports and/or allows access to the first network.

In an implementation, the first service in the second information may be one or more first services in the first information, in other words, the first service in the second information may be some or all first services in the first information. The first service in the second information may be a first service in the second related information that is of the first service and that is included in the second information. The first service in the first information may be a first service in the first related information that is of the first service and that is included in the first information.

In an implementation, the first network in the second information may be one or more first networks in the first information, in other words, the first network in the second information may be some or all first networks in the first information. The first network in the second information may be a first network in the second related information that is of the first network and that is included in the second information. The first network in the first information may be a first network in the first related information that is of the first network and that is included in the first information.

In an implementation, the first DNN in the second information may be one or more first DNNs in the first information, in other words, the first DNN in the second information may be some or all first DNNs in the first information. The first DNN in the second information may be a first DNN in the information that is about the first DNN and that is included in the second information. The first DNN in the first information may be a first DNN in the information that is about the first DNN and that is included in the first information.

In some examples, the data channel of the first service may include at least one of the following: accessing the first service through the data channel of the first network of the second network, or accessing the first service through the data channel of the second network.

In some examples, the data channel of the first network may include at least one of the following: accessing the first network through the data channel of the first network of the second network, or accessing the first network through the data channel of the second network.

In some examples, the first service may be a network service of the first network. The first service may be one or more network services.

In some examples, a network type of the first network may be a public network or a non-public network. In some examples, a network type of a second network may include at least one of the following: a public network, a non-public network, or a public network that supports a non-public network.

In some examples, the first network may be further differentiated into at least one of the following: a first public network or a first non-public network. When the first network is a first public network, the second network may include at least one of the following: a non-public network or a second public network. When the first network is a first non-public network, the second network may include at least one of the following: a second non-public network or a public network.

In some examples, the first service may be further differentiated into at least one of the following: a first public network service or a first non-public network service. The first public network service may be one or more network services in network services of the first public network. The first non-public network service may be one or more network services in network services of the first non-public network.

In some examples, the second information may be sent to a network element at a second target end.

The second target end may include at least one of the following: the first network, the second network, a public network, a non-public network, or a public network that supports a non-public network. The second network may include at least one of the following: a public network, a non-public network, or a public network that supports a non-public network. In an implementation, when the first network is a non-public network, related information of the non-public network may be sent to at least one of the following: a public network, the first network, a non-public network other than the first network, or a public network that supports the non-public network. In another implementation, when the first network is a non-public network, related information of a public network service may be obtained from at least one of the following: a non-public network or a public network that supports a non-public network.

In an implementation, the related information of the first service and the related information of the first DNN and/or the first network may be included in at least one of the following: a network service request message, a data channel establishment request message, a data channel activation request message, a NAS message that carries a network service request, a NAS message that carries a data channel establishment request, or a NAS message that carries a data channel activation request.

The network element at the second target end may include at least one of the following: a RAN network element (for example, a gNB and/or an eNB) or a CN network element (for example, an AMF, a UDM, an SMF, a PCF, and/or an MME). For example, when the third communications device is a terminal, the first information may be obtained from the CN network element or the RAN network element. For example, when the third communications device is a terminal, the second information may be sent to the CN network element and/or the RAN network element. For example, when the third communications device is a RAN network element, the second information may be sent to the CN network element and/or another RAN network element. For example, when the third communications device is a CN network element, the second information may be sent to another CN network element and/or the RAN network element.

Optionally, the second related information of the first service includes at least one of the following: network service description information of the first service, network description information of the first network that provides the first service, network description information of the second network, where it is requested to access the first service through the second network, DNN information of the first service, or slice information of the first service.

In an implementation, the terminal may request (for example, through the second network) to access the first service from the first network, and send, to the first network, related information of the first service that is requested to access. The related information of the first service may include at least one of the following: network service description information of the first service, or network description information of the second network, where it is requested to access the first service through the second network. In another implementation, the terminal requests to access the first service from the second network, and sends, to the second network, related information of the first service that is requested to access. The related information of the first service may include at least one of the following: network service description information of the first service, or network description information of the first network that provides the first service.

In some examples, the DNN information of the first service may include at least one of the following: DNN information of the second network, where the DNN is used to access the first service; DNN information of the first network, where the DNN is used to access the first service; or DNN information of the first network, where the DNN is used to access the first network through the second network.

In some examples, the slice information of the first service may include at least one of the following: slice information of the second network, where the slice is used to access the first service; slice information of the first network, where the slice is used to access the first service; or slice information of the first network, where the slice is used to access the first network through the second network.

In some examples, the network service description information may include at least one of the following: information indicating whether the network service is an isolated network service, network service identifier information, network service name information, corresponding application information, or network service type information. In some examples, the network service identifier information includes at least one of the following: non-public network service identifier information or public network service identifier information. In some examples, the network service type information may include at least one of the following: a non-public network service or a public network service.

In some examples, the network description information may include at least one of the following: information indicating whether a network is an isolated network, network identifier information, network type information, information about an operation body (for example, an operator) of the network, DNN information, or slice information. In some examples, the network identifier information may include at least one of the following: network identifier information of a non-public network or network identifier information of a public network. In some examples, the network type information may include at least one of the following: a non-public network, a public network, or a public network that supports a non-public network.

Optionally, the second related information of the first network includes at least one of the following: network description information of the first network, or network description information of the second network, where it is requested to access the first network through the second network.

In an implementation, the terminal may request to access the first network from the second network, and send, to the second network, related information of the first network requested to access. The related information of the first network may include network description information of the first network. In another implementation, the terminal may request (for example, through the second network) to access the first network from the first network, and send, to the first network, related information of the first network requested to access. The related information of the first network may include network description information of the second network, where it is requested to access the first network through the second network.

Based on some embodiments of the present disclosure, different service area requirements of different first services can be distinguished. Therefore, access to the first service through an allowed second network can be supported, and in addition, it can be controlled not to access the first service through an unallowed second network. In one aspect, a service area of a network service is extended, and in another aspect, privacy and security requirements of the network service are ensured.

Figure 5:
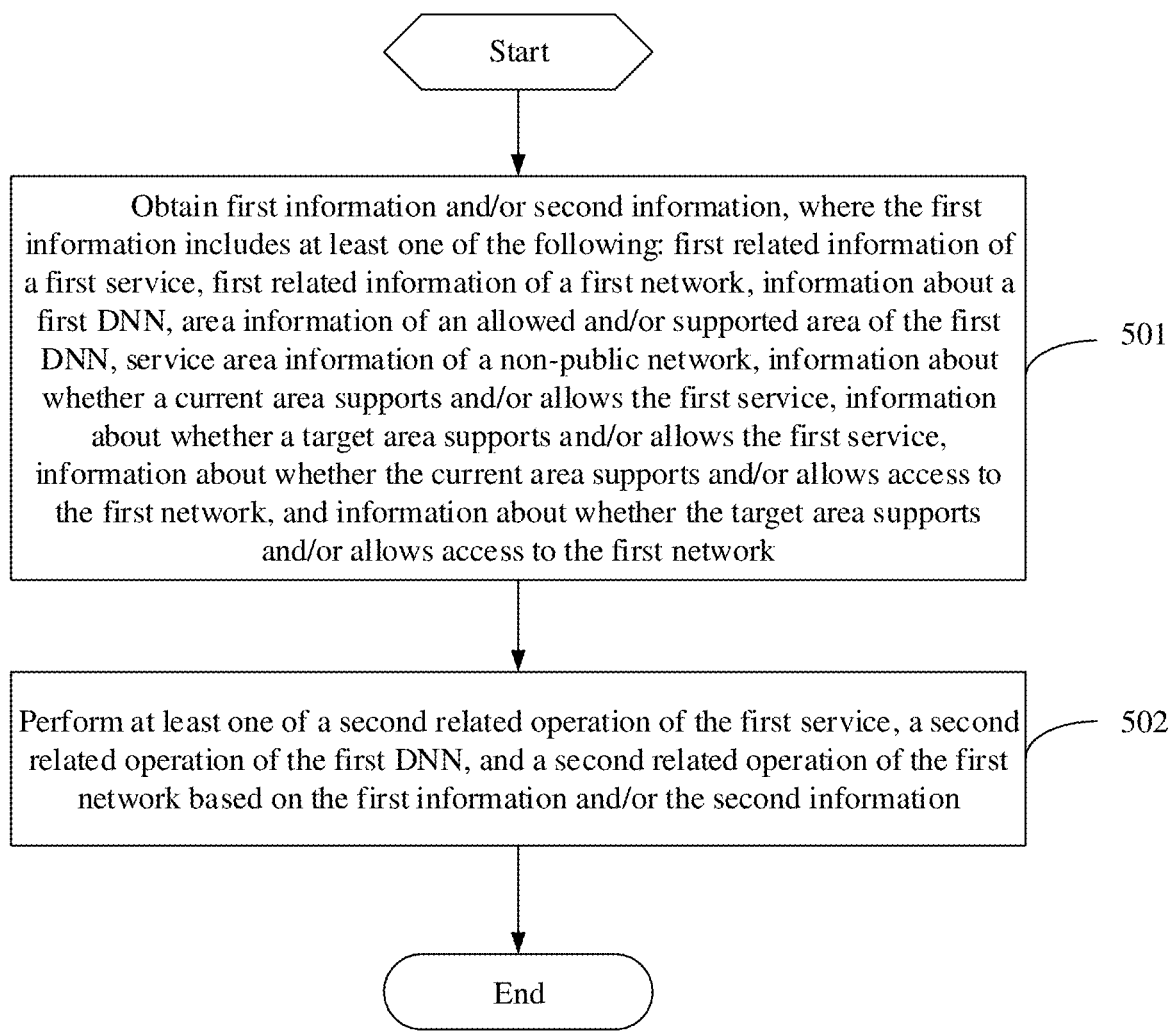
FIG. 5 is a schematic diagram of a network service control method according to some embodiments of the present disclosure.

Referring to FIG. 5, FIG. 5 is a flowchart of a network service control method according to some embodiments of the present disclosure. The network service control method in this embodiment may be applied to a fourth communications device. The fourth communications device may include but is not limited to at least one of the following: a CN network element (for example, an SMF and/or an AMF), or a RAN network element (for example, a gNB and/or an eNB). As shown in FIG. 5, the method includes the following steps.

Step 501: obtaining first information and/or second information.

The first information includes at least one of the following: first related information of a first service, first related information of a first network, information about a first DNN, area information of an allowed and/or supported area of the first DNN, service area information of a non-public network, information about whether a current area supports and/or allows the first service, information about whether a target area supports and/or allows the first service, information about whether the current area supports and/or allows access to the first network, or information about whether the target area supports and/or allows access to the first network.

The second information includes at least one of the following: second related information of the first service, second related information of the first network, or the information about the first DNN.

Step 502: performing at least one of a second related operation of the first service, a second related operation of the first DNN, or a second related operation of the first network based on the first information and/or the second information.

In some examples, the first service may be a network service of the first network. The first service may be one or more network services.

In some examples, a network type of the first network may be a public network or a non-public network. In some examples, a network type of a second network may include at least one of the following: a public network, a non-public network, or a public network that supports a non-public network.

In some examples, the first network may be further differentiated into at least one of the following: a first public network or a first non-public network. When the first network is a first public network, the second network may include at least one of the following: a non-public network or a second public network. When the first network is a first non-public network, the second network may include at least one of the following: a second non-public network or a public network.

In some examples, the first service may be further differentiated into at least one of the following: a first public network service or a first non-public network service. The first public network service may be one or more network services in network services of the first public network. The first non-public network service may be one or more network services in network services of the first non-public network.

In some examples, the fourth communications device may be a network element of the first network and/or a network element of a second network. In an implementation, when the first network and the second network share a network element, the network element is both the network element of the first network and the network element of the second network. In an implementation, the fourth communications device obtains the second information from an access request (the access request is, for example, an attach request, a registration request, a location update request, and/or a TAU request) or a data channel request (for example, a data channel activation request and a data channel establishment request) initiated by a terminal.

In an implementation, the first information and/or the second information may be obtained from the terminal and/or a network element at a second source end.

The second source end may include at least one of the following: the first network, the second network, a public network, a non-public network, or a public network that supports a non-public network. The second network may include at least one of the following: a public network, a non-public network, or a public network that supports a non-public network. When the first network is a non-public network, related information of the non-public network may be obtained from at least one of the following: a public network, the first network, a non-public network other than the first network, or a public network that supports a non-public network. When the first network is a non-public network, related information of a public network service may be obtained from at least one of the following: a non-public network or a public network that supports a non-public network.

The network element at the second source end may include at least one of the following: a RAN network element (for example, a gNB and/or an eNB) or a CN network element (for example, an AMF, a UDM, an SMF, a PCF, and/or an MME).

For example, when the fourth communications device is an AMF, the second information may be received from the terminal, and the first information may be obtained from at least one of the following: an SMF, a PCF, or another AMF. For example, when the fourth communications device is an SMF, the second information sent by the forwarding terminal may be received from the AMF, and the first information may be obtained from at least one of the following: a UDM, a PCF, or another SMF. For example, when the fourth communications device is a RAN network element, the first information and/or the second information may be received from at least one of the following: an AMF, a terminal, or another RAN network element, such as (policy control function, PCF).

In some examples, when a first event occurs, the second related operation of the first service and/or the second related operation of the first network are/is performed based on the first information and/or the second information.

The first event includes at least one of the following:
a request for accessing the first service is obtained;
a location of a terminal that accesses the first service changes;
a request for accessing the first network is obtained;
a location of a terminal that accesses the first network changes;
a terminal location update notification is received;
a handover request for the terminal is received;
location update occurs;
a data channel activation request of the first service is received;
a data channel establishment request of the first service is received;
a data channel activation request used to access the first network is received;
a data channel establishment request used to access the first network is received;
a data channel activation request of the first DNN is received; or a data channel establishment request of the first DNN is received.

Optionally, the first related information of the first service includes at least one of the following:
network service description information of the first service;
network description information of the first network that provides the first service;
information about whether the terminal is allowed to access the first service;
information about whether the terminal is allowed to access the first service through the second network;
information about whether access to the first service is supported;

information about whether access to the first service through the second network is supported;

area information of an area in which access to the first service is allowed (which may include a network in which access to the first service is allowed);

network description information of the second network in which access to the first service is allowed;

information about whether the current area allows the terminal to access the first service;

information about whether the target area (which may include a target network such as a handed-over target network) allows the terminal to access the first service;

DNN information of the first service; or slice information of the first service.

In some examples, the network service description information is described in the embodiment of FIG. 2, and details are not described herein again. In some examples, the network service identifier information is described in the embodiment of FIG. 2, and details are not described herein again. In some examples, the network service type information is described in the embodiment of FIG. 2, and details are not described herein again.

Optionally, the first related information of the first network includes at least one of the following:

network description information of the first network;

information about whether the terminal is allowed to access the first network;

information about whether the terminal is allowed to access the first network through the second network;

information about whether access to the first network is supported;

information about whether access to the first network through the second network is supported;

area information of an area in which access to the first network is allowed;

network description information of the second network in which access to the first network is allowed;

information about whether the current area (which may include a current network) allows the terminal to access the first network;

information about whether the target area (which may include a target network such as a handed-over target network) allows the terminal to access the first network;

DNN information of the first network; or slice information of the first network.

In some examples, the network description information is described in the embodiment of FIG. 2, and details are not described herein again. In some examples, the network identifier information is described in the embodiment of FIG. 2, and details are not described herein again. In some examples, the network type information is described in the embodiment of FIG. 2, and details are not described herein again.

Optionally, the second related information of the first service includes at least one of the following: network service description information of the first service, network description information of the first network that provides the first service, network description information of the second network, where it is requested to access the first service through the second network, DNN information of the first service, or slice information of the first service.

Optionally, the second related information of the first network includes at least one of the following: network description information of the first network, or network description information of the second network, where it is requested to access the first network through the second network.

In some examples, the network description information of the non-public network is described in the embodiment of FIG. 2, and details are not described herein again.

In some examples, the area information of the service area of the non-public network is described in the embodiment of FIG. 2, and details are not described herein again.

In some examples, the information about the first DNN is described in the embodiment of FIG. 2, and details are not described herein again.

In some examples, the area information of the area that is allowed and/or supported by the first DNN is described in the embodiment of FIG. 2, and details are not described herein again.

In some examples, before the information about the first service is obtained, at least one of the following may be sent: request information of first service information or request information of first network information.

In an implementation, the request information of the first service information may be sent to the UDM and/or the PCF. Based on the request information, the UDM and/or the PCF may return the first related information of the first service and/or the first related information of the first service. The returned first related information of the first service may include subscription information or policy information of the first service of the terminal. The returned first related information of the first service may include subscription information or policy information of the first network of the terminal.

Optionally, the information about whether the current area supports and/or allows the first network may include at least one of the following: the network description information of the first network or area information of the current area.

Optionally, the information about whether the target area supports and/or allows the first network may include at least one of the following: the network description information of the first network or area information of the target area.

Optionally, the information about whether the current area supports and/or allows the first service may include at least one of the following: the network description information of the first network, the service description information of the first service, or area information of the current area.

Optionally, the information about whether the target area supports and/or allows the first service may include at least one of the following: the network description information of the first network, the service description information of the first service, or area information of the target area.

The current area or the target area may be described by using at least one of the following: a network, a TA (Tracking Area), a RAN notification area (RNA), a cell, all cells of a RAN network element, a location area, a tracking area, a service area, or a routing area.

The area information may include at least one of the following: network identifier information, TA identifier information, RNA identifier information, cell identifier information, RAN network element identifier information, tracking area identifier information, service area identifier information, or routing area identifier information.

In some examples, the current area may include at least one of the following: a network (for example, a second network or a first network accessed through the second network) currently accessed by the terminal, a location area list (for example, a TAI list) configured for the terminal by a CN network element (for example, an AMF), or an area (for example, a TA, a cell, or a RAN network element) on which the terminal currently camps.

In some examples, the target area may include at least one of the following: a target network to which the terminal is handed over, a network requested to access (for example, a second network requested to access and/or a first network requested to access through the second network), or an area (for example, a TA, a cell, or a RAN network element) that the terminal requests to access.

In some embodiments of the present disclosure, an area other than unallowed area may be considered as an allowed area, and an area other than allowed area information may be considered as an unallowed area.

Optionally, a second related operation of the first service includes at least one of the following:
  an operation of subscribing to a terminal location change notification;
  an operation of determining a location update area of the terminal;
  performing a related operation of a data channel of the first service; and
  a related operation of determining whether to accept (which also referred to as whether to reject) a request of the first service.

Optionally, a second related operation of the first network includes at least one of the following:
  an operation of subscribing to a terminal location change notification;
  an operation of determining a location update area of the terminal;
  performing a related operation of a data channel of the first network; or
  a related operation of determining whether to accept a request for accessing the first network.

In an implementation, the related operation of the request for accessing the first network includes at least one of the following: a registration request of the first network or a location update request.

Optionally, the operation of subscribing to a terminal location change notification includes: determining information about an area of interest based on the first information. In some examples, the terminal location change notification is subscribed to from a target end (for example, a network element (for example, an AMF) responsible for mobility management) and a determined area of interest is sent. In an implementation, the fourth communications device is an SMF. The SMF subscribes to the terminal location change notification from the AMF and sends a determined area of interest to the AMF.

In some examples, the step of determining information about an area of interest based on the first information may include: determining the information about the area of interest based on service area information of a non-public network, allowed area information of the first service, and/or DNN information of the first service. It is not difficult to understand that when the terminal moves out of or moves into the area of interest, the target end sends the terminal location update notification. It is not difficult to understand that, by using the location update notification, it may be known whether the terminal moves out or moves into a service area of a non-public network and/or an allowed area of the first service. The related operation of the data channel of the first service may be further performed based on the information.

The information about the area of interest includes at least one of the following: service area information of the non-public network, allowed area information of the first service, DNN information of the first service, or the information about the first DNN.

The information about the area of interest includes at least one of the following: service area information of the non-public network, allowed area information of the first service, DNN information of the first service, or the information about the first DNN.

Optionally, the operation of determining the location update area of the terminal includes: determining location update area information based on the first information. The location update area is a location update request (for example, a registration request or a TAU request) initiated by the terminal to a network when the terminal moves out of the location update area. In an implementation, the fourth communications device is an AMF, and the AMF determines an operation of updating a location of the terminal.

In some examples, the step of determining location update area information based on the first information may include: determining the location update area information based on service area information of a non-public network, allowed area information of the first service, information about the first DNN, and/or DNN information of the first service. It is not difficult to understand that when the terminal moves out or moves into the location update area information, the terminal sends a location update request to the network. It is not difficult to understand that, by using the location update request, it may be known whether the terminal moves out or moves into a service area of a non-public network and/or an allowed area of the first service. The related operation of the data channel of the first service may be further performed based on the information.

In some examples, before the related operation of the data channel of the first service is performed, a data channel establishment request and/or a data channel activation request of the first service are/is obtained.

Optionally, the performing a related operation of a data channel of the first network may include at least one of the following:
  determining whether to establish a data channel of the first network;
  determining whether to activate the data channel of the first network;
  determining whether to switch the data channel of the first network;
  determining whether to suspend or delete the data channel of the first network; or
  determining whether to send context of the data channel of the first service.

In some examples, the data channel of the first network includes at least one of the following: accessing the first network through the data channel of the first network of the second network, or accessing the first network through the data channel of the second network.

In some examples, when a first condition is met, it may be determined that a request of the first network is not accepted, context of the data channel of the first network is not sent, establishment of the data channel of the first network is rejected, activation of the data channel of the first network is rejected, the data channel of the first network is suspended or deleted, and/or the data channel of the first network is not switched.

In some examples, when a second condition is met, a request of the first network may be accepted, context of the data channel of the first network may be sent, the data channel of the first network may be established, the data channel of the first network may be activated, and/or the data channel of the first network may be switched.

Optionally, the performing a related operation of a data channel of the first service includes at least one of the following:
- determining whether to request to establish a data channel of the first service;
- determining whether to request to activate the data channel of the first service;
- determining whether to switch the data channel of the first service;
- determining whether to suspend or delete the data channel of the first service; or
- determining whether to send context of the data channel of the first service.

In some examples, the data channel of the first service includes at least one of the following: accessing the first service through the data channel of the first network of the second network, or accessing the first service through the data channel of the second network.

In some examples, when a first condition is met, it may be determined that a request of the first service is not accepted, context of the data channel of the first service is not sent, establishment of the data channel of the first service is rejected, activation of the data channel of the first service is rejected, the data channel of the first service is suspended or deleted, and/or the data channel of the first service is not switched.

In some examples, when a second condition is met, it may be determined that a request of the first service is accepted, context of the data channel of the first service is sent, the data channel of the first service is established, the data channel of the first service is activated, and/or the data channel of the first service is switched.

Optionally, performing a second related operation of the first DNN includes at least one of the following:
- determining whether to request to establish a data channel of the first DNN;
- determining whether to activate the data channel of the first DNN;
- determining whether to switch the data channel of the first DNN;
- determining whether to suspend or delete the data channel of the first DNN; or
- determining whether to send context of the data channel of the first DNN.

In some examples, the first DNN may be a DNN of the first network or a DNN of the second network. The DNN of the first network is a DNN of the data channel of the first network, and the data channel of the first network is allowed to be established through the second network. The DNN of the second network is a DNN of a data channel of the second network, and it is allowed to access the first network through the data channel of the second network. When the first DNN is the DNN of the second network, an area allowed by the first DNN includes the allowed first network.

In some examples, when a first condition is met, it may be determined that context of the data channel of the first DNN is not sent, establishment of the data channel of the first DNN is rejected, activation of the data channel of the first DNN is rejected, the data channel of the first DNN is suspended or deleted, and/or the data channel of the first DNN is not switched.

In some examples, when a second condition is met, it may be determined that context of the data channel of the first DNN is sent, the data channel of the first DNN is established, the data channel of the first DNN is activated, and/or the data channel of the first DNN is switched.

The first condition is described in the embodiment of FIG. 2, and details are not described herein again.

The second condition is described in the embodiment of FIG. 2, and details are not described herein again.

It should be noted that multiple optional implementations described in some embodiments of the present disclosure may be implemented in combination with each other, or may be separately implemented. This is not limited in some embodiments of the present disclosure.

Based on some embodiments of the present disclosure, different service area requirements of different first services can be distinguished. Therefore, access to the first service through an allowed second network can be supported, and in addition, it can be controlled not to access the first service through an unallowed second network. In one aspect, a service area of a network service is extended, and in another aspect, privacy and security requirements of the network service are ensured.

It is not difficult to understand that, for example, when the first network is a non-public network, a service area of the first network is a limited area (for example, an office building or a factory). When the second network is a public network, a service range (also referred to as a coverage range) of the second network is relatively large. Outside the service area of the non-public network, the non-public network service may be accessed by using a public network or another non-public network. For example, when the first network is a public network, there are also some blind service areas. If these blind areas are covered by non-public networks, the allowed public network service can be provided for the terminal. Therefore, outside the service area of the first network, the allowed first service may be provided for the terminal by using coverage of the second network. Both access to the public network service through the non-public network and access to the non-public network service through the public network can be supported. In another aspect, when the first service is only allowed to be accessed through the first network, for example, control may also be provided for a network service with relatively high privacy security, so that the terminal is prevented from performing access through an unallowed area.

Embodiment 1

Figure 6:
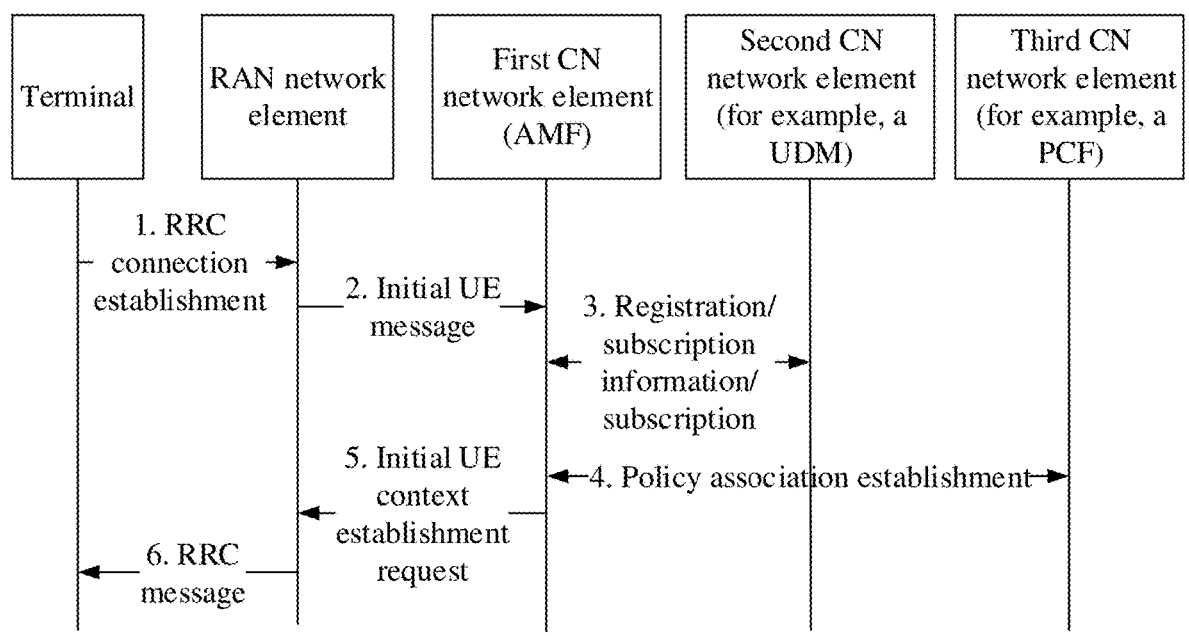
FIG. 6 is a schematic diagram of another network service control method according to some embodiments of the present disclosure.

This implementation mainly describes a process in which a terminal obtains first related information of a first service when the terminal registers with a first network (the first network may be a public network or a non-public network). As shown in FIG. 6, an AMF is used as an example of a first CN network element, a UDM is used as an example of a second CN network element, and a PCF is used as an example of a third CN network element. The process includes the following steps:

Step 1: the terminal establishes an RRC connection to a RAN network element.

The terminal sends at least one of the following to the RAN network element in an RRC message: selected network identifier information of the first network (for example, an identifier of a non-public network is selected) or a NAS message (a registration request message).

Step 2: the RAN network element sends an NG interface message such as an initial UE message to an AMF.

Optionally, the NG interface message includes at least one of the following: selected network identifier information of the first network (for example, a selected identifier of a non-public network, where the selected identifier of the non-public network may be included in a TAI) or a NAS message (a registration request message).

Optionally, the registration request message includes at least one of the following: request information of first service information, request information of first network information, network description information of the second network, where it is requested to access the first service through the second network, or second information.

The request information of the first service information may be used to request the first related information of the first service and/or the first related information of the first network.

The request information of the first network information may be used to request the first related information of the first service and/or the first related information of the first network.

The first information may be used to initiate the first service and/or request to access the first network.

The first service may include at least one of the following: a first public network service or a first non-public network service. The request information of the first service information is described in the embodiment of FIG. 2, and details are not described herein again. The second information is described in the embodiment of FIG. 4, and details are not described herein again.

In an implementation, the request information of the first service information may be capability information of the first service of the terminal. It is not difficult to understand that when the terminal has a capability of the first service, the network may send information about the first service to the terminal.

Step 3: the AMF registers with a UDM, the AMF requests to obtain subscription information of the terminal from the UDM, and the UDM sends subscription data of the terminal to the AMF.

Optionally, the subscription data of the terminal includes first information (for example, first related information of a first network, first related information of a first service, information about a first DNN, and/or area information of an allowed area of the first DNN). The first information is specifically described in the embodiment of FIG. 2.

In an implementation, the terminal accesses the first network through the second network, but the subscription data of the terminal does not allow access to the first network through the second network. The AMF rejects registration of the terminal, and returns a registration rejection response and/or a rejection reason to the terminal. The rejection reason may be at least one of the following: the requested first service is not supported and/or allowed, the current area does not support and/or does not allow the requested first service, access to the requested first service through the current network is not supported and/or allowed, the first network requested to access is not supported and/or allowed, the current area does not support and/or does not allow the requested first network, or access to the requested first network through the current network is not supported and/or allowed.

When determining not to reject a registration request of the terminal, the AMF performs step 4.

Step 4: the AMF selects a PCF. The AMF establishes policy association about the terminal with the selected PCF. Optionally, a terminal policy sent by the PCF to the AMF may include the first information (for example, the first related information of the first network, the first related information of the first service, the information about the first DNN, and/or the area information of the allowed area of the first DNN). The first information is specifically described in the embodiment of FIG. 2.

The first DNN may be a DNN in a URSP (UE Route Selection Policy).

In an implementation, the terminal accesses the first network through the second network, but the terminal policy does not allow access to the first network through the second network. The AMF rejects registration of the terminal, and returns a registration rejection response and/or a rejection reason to the terminal. The rejection reason is described in step 2, and details are not described herein again.

Step 5: the AMF sends an NG interface message such as an initial UE context setup request message to the RAN network element. The NG interface message includes a registration acceptance message.

Optionally, the NG interface message includes the first information.

Step 6: a 5G radio access network sends an RRC message to the terminal, where the RRC message includes the registration acceptance message.

In an implementation, the terminal successfully performs registration and receives the first information. The terminal may perform a first related operation of the first service and/or a first related operation of the first network based on the first information. That the first related operation of the first service and/or the first related operation of the first network may be performed based on the first information is described in the embodiment of FIG. 2, and details are not described herein again.

In another implementation, the terminal receives the registration reject message and/or the reject reason, and may obtain at least one of the following: information about whether the current area does not support and/or does not allow the first service, information about whether the current area does not support and/or does not allow the first network, information indicating that access to the first network through the second network is not supported and/or not allowed, or information indicating that access to a first network service through the second network is not supported and/or not allowed. When the terminal initiates a registration request to the first network through the second network, the current area may be an area of the second network currently accessed by the terminal.

In an implementation, the AMF determines, based on the obtained first information and/or the obtained second information, whether to accept the registration request of the terminal. This is described in the embodiment of FIG. 5, and details are not described herein again.

Embodiment 2

This implementation mainly describes a process in which a terminal obtains first related information of a first service when the terminal registers with a second network. As shown in FIG. 6, an AMF is used as an example of a first CN network element, a UDM is used as an example of a second CN network element, and a PCF is used as an example of a third CN network element. The process includes the following steps:

Step 1: the terminal establishes an RRC connection to a RAN network element.

The terminal sends at least one of the following to the RAN network element in an RRC message: selected network identifier information of the second network (for example, an identifier of a non-public network is selected) or a NAS message (a registration request message).

Step 2: the RAN network element sends an NG interface message such as an initial UE message to an AMF.

Optionally, the NG interface message includes at least one of the following: selected network identifier information of the second network (for example, a selected identifier of a non-public network, where the selected identifier of the non-public network may be included in a TAI) or a NAS message (a registration request message).

Optionally, the registration request message includes at least one of the following: request information of first service information, request information of first network information, network description information of the second network, where it is requested to access the first service through the second network, or second information.

The request information of the first service information may be used to request the first related information of the first service and/or the first related information of the first network.

The request information of the first network information may be used to request the first related information of the first service and/or the first related information of the first network.

The first information may be used to initiate the first service and/or request to access the first network.

The first service may include at least one of the following: a first public network service or a first non-public network service. The request information of the first service information is described in the embodiment of FIG. 2, and details are not described herein again. The second information is described in the embodiment of FIG. 4, and details are not described herein again.

In an implementation, the request information of the first service information may be capability information of the first service of the terminal. It is not difficult to understand that when the terminal has a capability of the first service, the network sends information about the first service to the terminal.

Step 3: the AMF registers with a UDM, the AMF requests to obtain subscription information of the terminal from the UDM, and the UDM sends subscription data of the terminal to the AMF.

Optionally, the subscription data of the terminal includes first information (for example, first related information of a first network, first related information of a first service, information about a first DNN, and/or area information of an allowed area of the first DNN). The first information is specifically described in the embodiment of FIG. 2.

In an implementation, the terminal accesses the first network through the second network, but the terminal policy does not allow access to the first network through the second network. The AMF rejects registration of the terminal, and returns a registration rejection response and/or a rejection reason to the terminal. The rejection reason may be at least one of the following: the requested first service is not supported and/or allowed, the current area does not support and/or does not allow the requested first service, access to the requested first service through the current network is not supported and/or allowed, the first network requested to access is not supported and/or allowed, the current area does not support and/or does not allow the requested first network, or access to the requested first network through the current network is not supported and/or allowed.

The terminal receives the registration reject message and/or the reject reason, and may obtain at least one of the following: information about whether a current area does not support and/or does not allow the first service, information about whether the current area does not support and/or does not allow the first network, information indicating that access to the first network through the second network is not supported and/or not allowed, or information indicating that access to a first network service through the second network is not supported and/or not allowed. When the terminal initiates a registration request to the first network through the second network, the current area may be an area of the second network currently accessed by the terminal.

Step 4: the AMF selects a PCF. The AMF establishes policy association about the terminal with the selected PCF. Optionally, a terminal policy sent by the PCF to the AMF may include first information (for example, the first related information of the first network, the first related information of the first service, information about the first DNN, and/or the area information of the allowed area of the first DNN). The first information is specifically described in the embodiment of FIG. 2.

The first DNN may be a DNN in a URSP.

Step 5: the AMF sends an NG interface message such as an initial UE context setup request message to the RAN network element. The NG interface message includes a registration acceptance message.

Optionally, the NG interface message includes the first information.

Step 6: a 5G radio access network sends an RRC message to the terminal, where the RRC message includes the registration acceptance message.

In an implementation, the terminal successfully performs registration and receives the first information. The terminal may perform a first related operation of the first service and/or a first related operation of the first network based on the first information. That the first related operation of the first service and/or the first related operation of the first network may be performed based on the first information is described in the embodiment of FIG. 2, and details are not described herein again.

In another implementation, the terminal receives the registration reject message and/or the reject reason, and may obtain at least one of the following: information about whether the current area does not support and/or does not allow the first service, information about whether the current area does not support and/or does not allow the first network, information indicating that access to the first network through the second network is not supported and/or not allowed, or information indicating that access to a first network service through the second network is not supported and/or not allowed. When the terminal initiates a registration request to the first network through the second network, the current area may be an area of the second network currently accessed by the terminal.

In an implementation, the AMF determines, based on the obtained first information and/or the obtained second information, whether to accept the registration request of the terminal. This is described in the embodiment of FIG. 5, and details are not described herein again.

Embodiment 3

This implementation mainly describes a process in which a terminal obtains related information of a non-public network when the terminal registers with a non-public network and/or a public network that supports a non-public network. As shown in FIG. 6, an AMF is used as an example of a first CN network element, a UDM is used as an example of a second CN network element, and a PCF is used as an example of a third CN network element. The process includes the following steps:

Step 1: the terminal establishes an RRC connection to a RAN network element.

Optionally, the RAN network element may include at least one of the following: a RAN network element that supports a non-public network, or a RAN network element that supports a public network, where the public network supports a non-public network.

The terminal sends at least one of the following to the RAN network element in an RRC message: a selected non-public network identifier or a NAS message (a registration request message).

Step 2: the RAN network element sends an NG interface message such as an initial UE message to an AMF.

Optionally, the NG interface message includes at least one of the following: a selected non-public network identifier (the selected non-public network identifier may be included in a TAI) or a NAS message (a registration request message).

Step 3: the AMF registers with a UDM, the AMF requests to obtain subscription information of the terminal from the UDM, and the UDM sends subscription data of the terminal to the AMF.

Optionally, the subscription data includes subscription data of the non-public network.

Optionally, the subscription data of the non-public network includes at least one of the following: network description information of the non-public network or area information of a service area of the non-public network.

Step 4: the AMF selects a PCF. The AMF establishes policy association about the terminal with the selected PCF.

Optionally, a terminal policy sent by the PCF to the AMF may include at least one of the following: network description information of the non-public network or area information of a service area of the non-public network.

Step 5: the AMF sends an NG interface message such as an initial UE context setup request message to the RAN network element. The NG interface message includes a registration acceptance message.

Optionally, the NG interface message includes at least one of the following: network description information of the non-public network or area information of a service area of the non-public network.

Step 6: a 5G radio access network sends an RRC message to the terminal, where the RRC message includes the registration acceptance message.

The terminal may perform a first related operation of a first service and/or a first related operation of a first network based on the first information (for example, network description information of a non-public network and/or area information of a service area of a non-public network). That the first related operation of the first service and/or the first related operation of the first network may be performed based on the first information is described in the embodiment of FIG. 2, and details are not described herein again.

Embodiment 4

Figure 7:
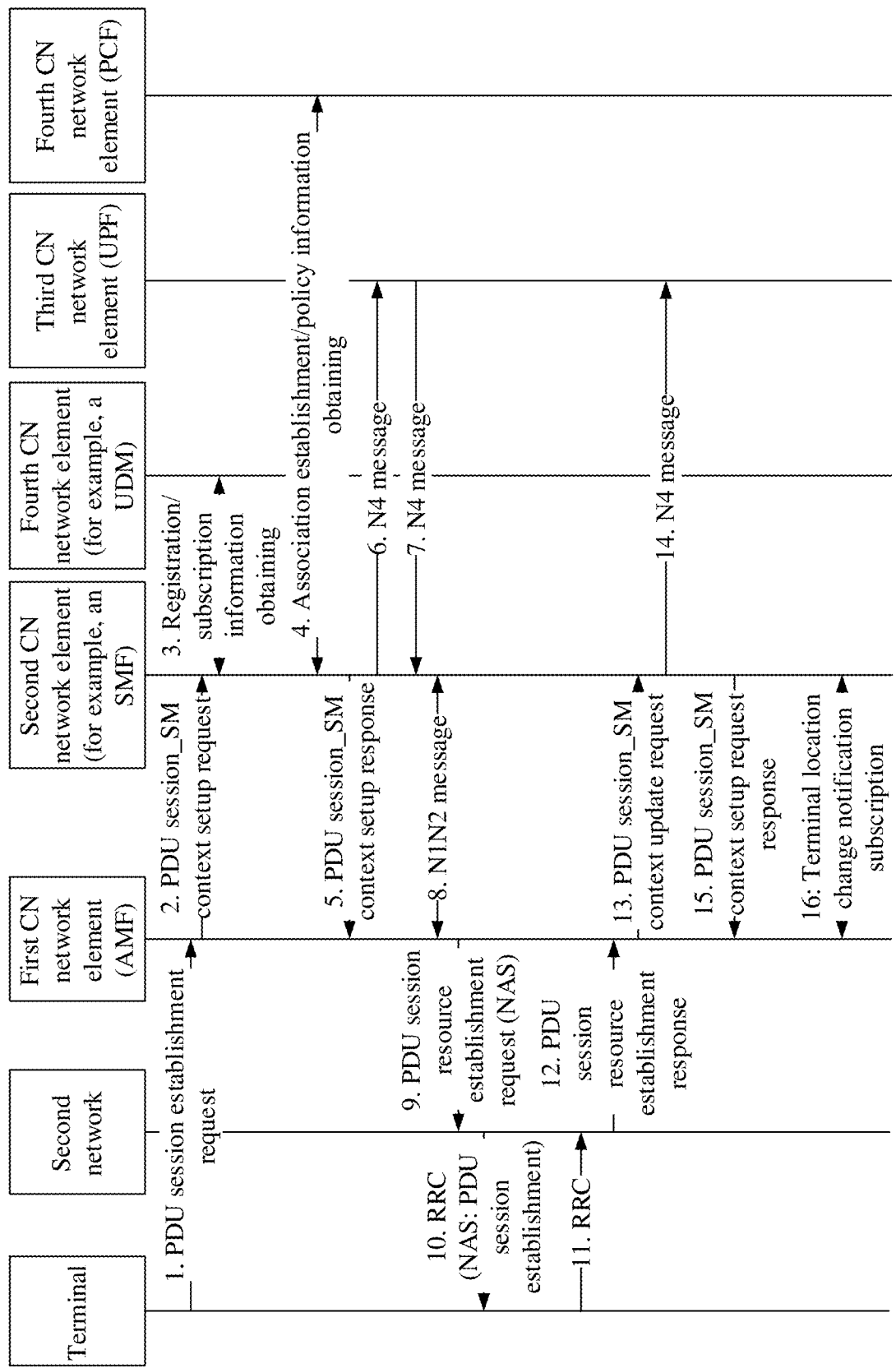
FIG. 7 is a schematic diagram of another network service control method according to some embodiments of the present disclosure.

This implementation mainly describes a process in which a terminal requests to establish a PDU session of a first service in a first network (the first network may be a public network or a non-public network). Referring to FIG. 7, as shown in FIG. 7, the process includes the following steps:

Step 1: the terminal sends a NAS message to an AMF, where the NAS message includes a PDU session establishment request message.

Optionally, the NAS message may include at least one of the following: second related information of the first service (for example, a DNN of the first service, network description information of a second network, where it is requested to access the first service through the second network, and/or slice information of the first service) or information about a first DNN.

Optionally, the PDU session establishment request message may include at least one of the following: second related information of the first service (for example, a DNN of the first service, network description information of the second network, where it is requested to access the first service through the second network, and/or slice information of the first service) or the information about the first DNN.

Step 2: the AMF sends a PDU session_SM context setup request message to a selected SMF.

Optionally, the SM context setup request message may include the second related information of the first service.

After receiving the PDU session_setup request message, the AMF may select an SMF based on second information (for example, a DNN of the first service, slice information of the first service, and/or the first DNN) in the PDU session_setup request message.

In specific implementation, the AMF may select the SMF directly or through an NSSF.

Step 3: the SMF may further obtain and subscribe to subscription data of the terminal from a UDM, and the SMF requests to obtain subscription information of the terminal from the UDM.

In an implementation, the SMF sends the DNN of the first service to the UDM, to request to obtain area information of an allowed area of the first service.

In an implementation, the SMF sends the first DNN to the UDM, to request to obtain area information of an allowed area of the first DNN.

The UDM sends first information (for example, first related information of the first network, first related information of the first service, the area information of the allowed area of the first service, the information about the first DNN, and the area information of the allowed area of the first DNN) to the SMF.

The SMF performs a second related operation of the first service and/or a second related operation of the first network based on the first information and/or the second information. This is specifically described in the embodiment of FIG. 5, and details are not described herein again.

In an implementation, the terminal accesses the first network through the second network, but the terminal does not allow access to the first service through the second network. The AMF rejects a PDU session establishment request of the terminal, and returns a PDU session establishment rejection response and/or a rejection reason to the terminal.

Step 4: the SMF may obtain a policy of the terminal from a PCF.

In an implementation, the SMF sends the DNN of the first service to the PCF, to request to obtain the area information of the allowed area of the first service.

In an implementation, the SMF sends the first DNN to the PCF, to request to obtain the area information of the allowed area of the first DNN.

The PCF sends the first information (for example, the first related information of the first network, the first related information of the first service, the area information of the allowed area of the first service, the information about the first DNN, and the area information of the allowed area of the first DNN) to the SMF.

The SMF performs a second related operation of the first service and/or a second related operation of the first network based on the first information and/or the second information.

This is specifically described in the embodiment of FIG. 5, and details are not described herein again.

Step 5: the SMF returns a PDU session_SM context setup response to the AMF.

Step 6: the SMF sends an N4 message to a selected UPF.

Step 7: the UPF returns an N4 message (for example, an N4 session establishment response message) to the SMF.

Step 8: the SMF sends an N1N2 message to the AMF. The N1N2 message may include a NAS message for PDU session establishment.

Step 9: the AMF sends a PDU session resource establishment request message to a RAN network element. The PDU session resource establishment request message may include at least one of the following: an NAS message for PDU session establishment or the first information.

Step 10: the RAN network element configures a radio resource for the terminal and sends a PDU session establishment message to the terminal.

Step 11: the terminal returns an RRC response message to the RAN network element.

Step 12: the RAN network element returns a PDU session resource establishment response message to the AMF.

Step 13: the AMF sends a PDU session_SM context update request message to the SMF.

Step 14: the SMF sends an N4 message (for example, an N4 session update message) to the UPF.

Step 15: the SMF sends a PDU session_SM context update response message to the AMF.

Step 16: the SMF subscribes to a terminal location change notification from the AMF. Area of interest information sent by the SMF to the AMF may be area information of a service area of a non-public network, area information of an allowed area of the first network, and/or area information of an allowed area of the first service.

Subsequently, when the SMF receives the terminal location change notification of the AMF, the SMF performs a second related operation of the first service and/or a second related operation of the first network based on the first information and/or the second information. This is specifically described in the embodiment of FIG. 5, and details are not described herein again.

In an implementation, a PDU session of the terminal is successfully established. The SMF performs at least one of the second related operation of the first service, a second related operation of the first DNN, or the second related operation of the first network based on the first information and/or the second information. This is specifically described in the embodiment of FIG. 5. For example, it is determined whether to switch, activate, delete, or suspend the PDU session as the terminal moves.

In another implementation, the terminal receives a PDU session establishment rejection message and/or a rejection reason, and may obtain at least one of the following: information about whether a current area does not support and/or does not allow the first service, information about whether the current area does not support and/or does not allow the first network, information indicating that access to the first network through the second network is not supported and/or not allowed, or information indicating that access to a first network service through the second network is not supported and/or not allowed. When the terminal initiates a registration request to the first network through the second network, the current area may be an area of the second network currently accessed by the terminal.

Embodiment 5

This implementation mainly describes a process in which a terminal requests to establish a PDU session of a first service in a second network (the second network may be a public network or a non-public network). In some examples, the first service may be a network service of a first network. Referring to FIG. 7, as shown in FIG. 7, the process includes the following steps:

Step 1: the terminal sends a NAS message to an AMF, where the NAS message includes a PDU session establishment request message.

Optionally, the NAS message may include at least one of the following: second related information of the first service (for example, a DNN of the first service and/or slice information of the first service) or information about a first DNN.

Optionally, the PDU session establishment request message may include at least one of the following: second related information of the first service (for example, a DNN of the first service and/or slice information of the first service) or the information about the first DNN.

Step 2: the AMF sends a PDU session_SM context setup request message to a selected SMF.

Optionally, the SM context setup request message may include the second related information of the first service.

After receiving the PDU session_setup request message, the AMF may select an SMF based on second information (for example, a DNN of the first service, slice information of the first service, and/or the first DNN) in the PDU session setup request message.

In specific implementation, the AMF may select the SMF directly or through an NSSF.

Step 3: the SMF may further obtain and subscribe to subscription data of the terminal from a UDM, and the SMF requests to obtain subscription information of the terminal from the UDM.

In an implementation, the SMF sends the DNN of the first service to the UDM, to request to obtain area information of an allowed area of the first service.

In an implementation, the SMF sends the first DNN to the UDM, to request to obtain area information of an allowed area of the first DNN.

The UDM sends first information (for example, first related information of the first network, first related information of the first service, the area information of the allowed area of the first service, the information about the first DNN, and the area information of the allowed area of the first DNN) to the SMF.

The SMF performs a second related operation of the first service and/or a second related operation of the first network based on the first information and/or the second information. This is specifically described in the embodiment of FIG. 5, and details are not described herein again.

In an implementation, the terminal accesses the first network through the second network, but the terminal does not allow access to the first service through the second network. The AMF rejects a PDU session establishment request of the terminal, and returns a PDU session establishment rejection response and/or a rejection reason to the terminal.

Step 4: the SMF may obtain a policy of the terminal from a PCF.

In an implementation, the SMF sends the DNN of the first service to the PCF, to request to obtain the area information of the allowed area of the first service.

In an implementation, the SMF sends the first DNN to the PCF, to request to obtain the area information of the allowed area of the first DNN.

The PCF sends the first information (for example, the first related information of the first network, the first related information of the first service, the area information of the allowed area of the first service, the information about the first DNN, and the area information of the allowed area of the first DNN) to the SMF.

The SMF performs a second related operation of the first service and/or a second related operation of the first network based on the first information and/or the second information. This is specifically described in the embodiment of FIG. 5, and details are not described herein again.

Step 5 to step 16 are described in step 5 to step 16 in Embodiment 4, and details are not described herein again.

In an implementation, a PDU session of the terminal is successfully established. The SMF performs at least one of the second related operation of the first service, a second related operation of the first DNN, or the second related operation of the first network based on the first information and/or the second information. This is specifically described in the embodiment of FIG. 5. For example, it is determined whether to switch, activate, delete, or suspend the PDU session as the terminal moves.

In another implementation, the terminal receives a PDU session establishment rejection message and/or a rejection reason, and may obtain at least one of the following: information about whether a current area does not support and/or does not allow the first service, information about whether the current area does not support and/or does not allow the first network, information indicating that access to the first network through the second network is not supported and/or not allowed, or information indicating that access to a first network service through the second network is not supported and/or not allowed. When the terminal initiates a registration request to the first network through the second network, the current area may be an area of the second network currently accessed by the terminal.

Embodiment 6

Figure 8:
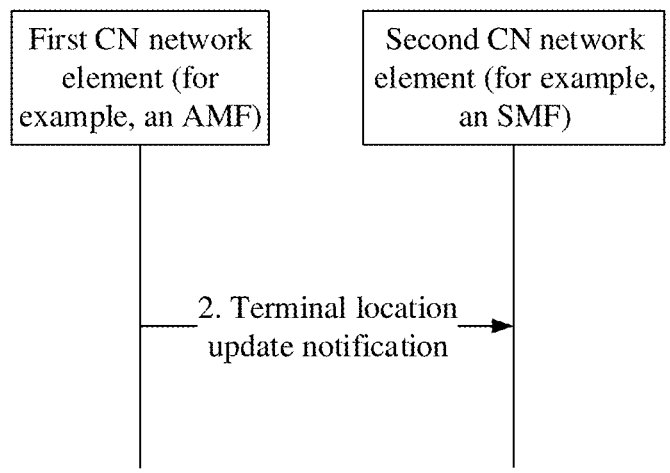
FIG. 8 is a schematic diagram of another network service control method according to some embodiments of the present disclosure.

This implementation mainly describes a process in which when an AMF notifies an SMF of terminal location update, the SMF determines whether to suspend or delete a data channel of a first service. As shown in FIG. 8, an AMF is used as an example of a first CN network element, and an SMF is used as an example of a second CN network element. The process includes the following steps:

Step 1: The AMF sends a terminal location change notification to the SMF. The terminal location update notification includes area information (for example, a TAI) of a current area of the terminal.

When a first condition is met (for example, the current area of the terminal does not support and/or does not allow the first service and/or a first network), a source SMF network element determines to suspend or delete the data channel of the first service. A specific operation is described in the embodiment of FIG. 5, and details are not described herein again.

When a second condition is met (for example, the current area of the terminal supports and/or allows the first service and/or the first network), the source SMF network element determines not to suspend or delete the data channel of the first service. A specific operation is described in the embodiment of FIG. 5, and details are not described herein again.

Embodiment 7

Figure 9:
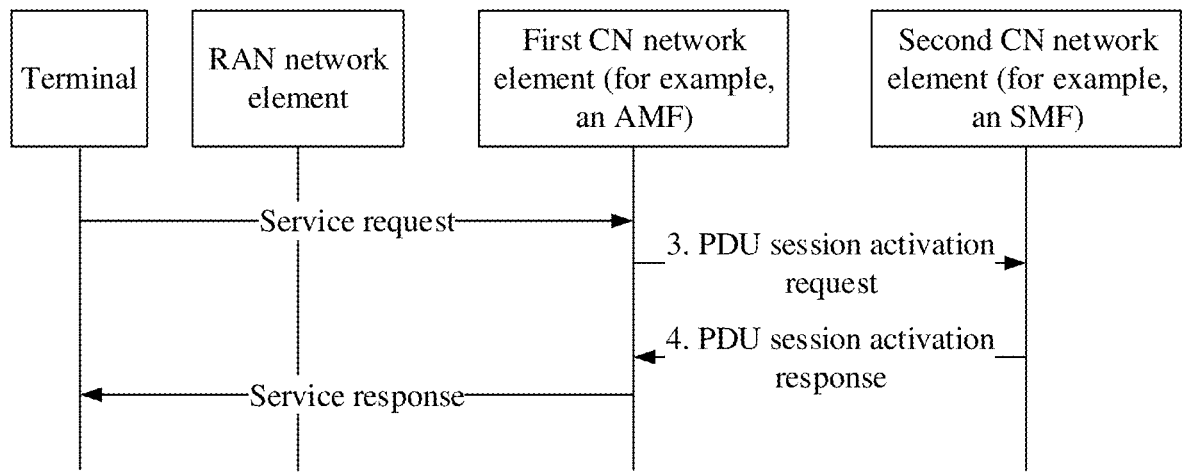
FIG. 9 is a schematic diagram of another network service control method according to some embodiments of the present disclosure.

This implementation mainly describes a process in which an SMF determines whether to switch a data channel of a first service when a terminal performs inter-RAN network element handover through a CN network element. As shown in FIG. 9, an AMF is used as an example of a first CN network element, and an SMF is used as an example of a second CN network element. The process includes the following steps:

Step 1: The terminal sends a second related message of the first service to the AMF to request to activate the data channel (for example, a PDU session) of the first service. The second related message of the first service may be included in a service request message.

Step 2: The AMF sends the second related message of the first service to the SMF to request to activate the data channel (for example, a PDU session) of the first service. The second related message of the first service may be included in a PDU session activation request. The PDU session activation request includes area information (for example, a TAI) of a current area of the terminal.

When a first condition is met (for example, a current area of the terminal does not support and/or does not allow the first service and/or the first network), the SMF network element determines not to activate the data channel of the first service. In this case, an activated PDU session result sent by the SMF network element to the AMF does not include the data channel of the first service. A specific operation is described in the embodiment of FIG. 5, and details are not described herein again.

When a second condition is met (for example, the current area of the terminal supports and/or allows the first service and/or the first network), the SMF network element determines not to activate the data channel of the first service. In this case, an activated PDU session result sent by the SMF network element to the AMF does not include the data channel of the first service. A specific operation is described in the embodiment of FIG. 5, and details are not described herein again.

Embodiment 8

Figure 10:
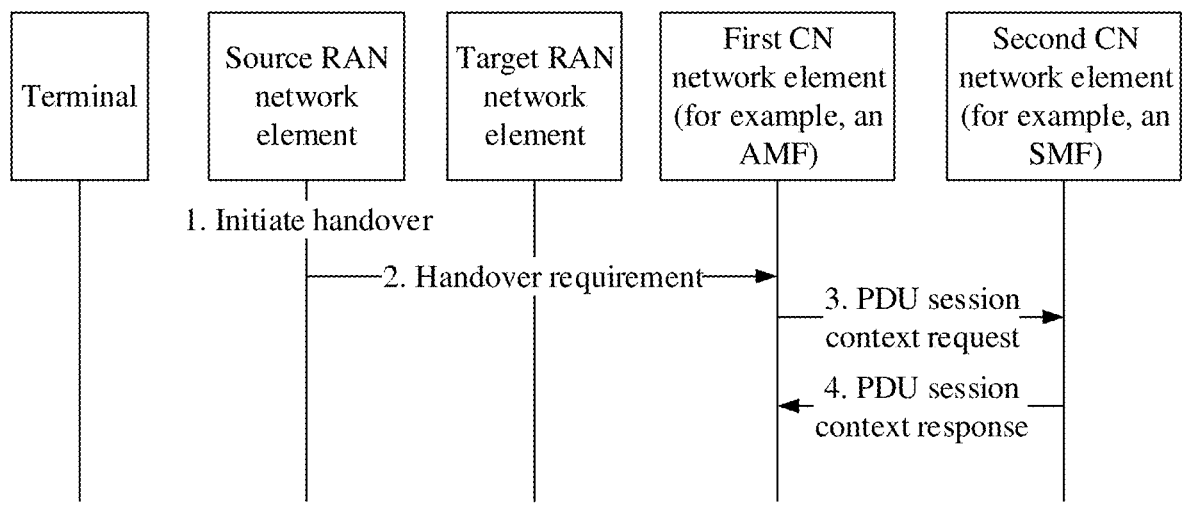
FIG. 10 is a schematic diagram of another network service control method according to some embodiments of the present disclosure.

This implementation mainly describes a process in which an SMF determines whether to switch a data channel of a first service when a terminal performs inter-RAN network element handover through a CN network element. As shown in FIG. 10, an AMF is used as an example of a first CN network element, and an SMF is used as an example of a second CN network element. The process includes the following steps:

Step 1: A source RAN network element sends a handover requirement to the AMF. The handover requirement includes area information (for example, a TAI) of a target area to be handed over to.

Step 2: The AMF sends a PDU session context request to the SMF. The handover requirement includes area information (for example, a TAI) of a target area to be handed over to.

When a first condition is met (for example, the target area to which the terminal is handed over does not support and/or does not allow the first service and/or a first network), the SMF network element determines not to switch the data channel of the first service, and/or determines to suspend or delete the data channel of the first service. In this case, the SMF network element does not send context of the data channel of the first service to the AMF. A specific operation is described in the embodiment of FIG. 5, and details are not described herein again.

When a second condition is met (for example, the target area to which the terminal is handed over supports and/or allows the first service and/or the first network), the SMF determines to switch the data channel of the first service, and/or determines not to suspend or delete the data channel of the first service. In this case, the SMF network element sends context of the data channel of the first service to the AMF. A specific operation is described in the embodiment of FIG. 5, and details are not described herein again.

Embodiment 9

Figure 11:
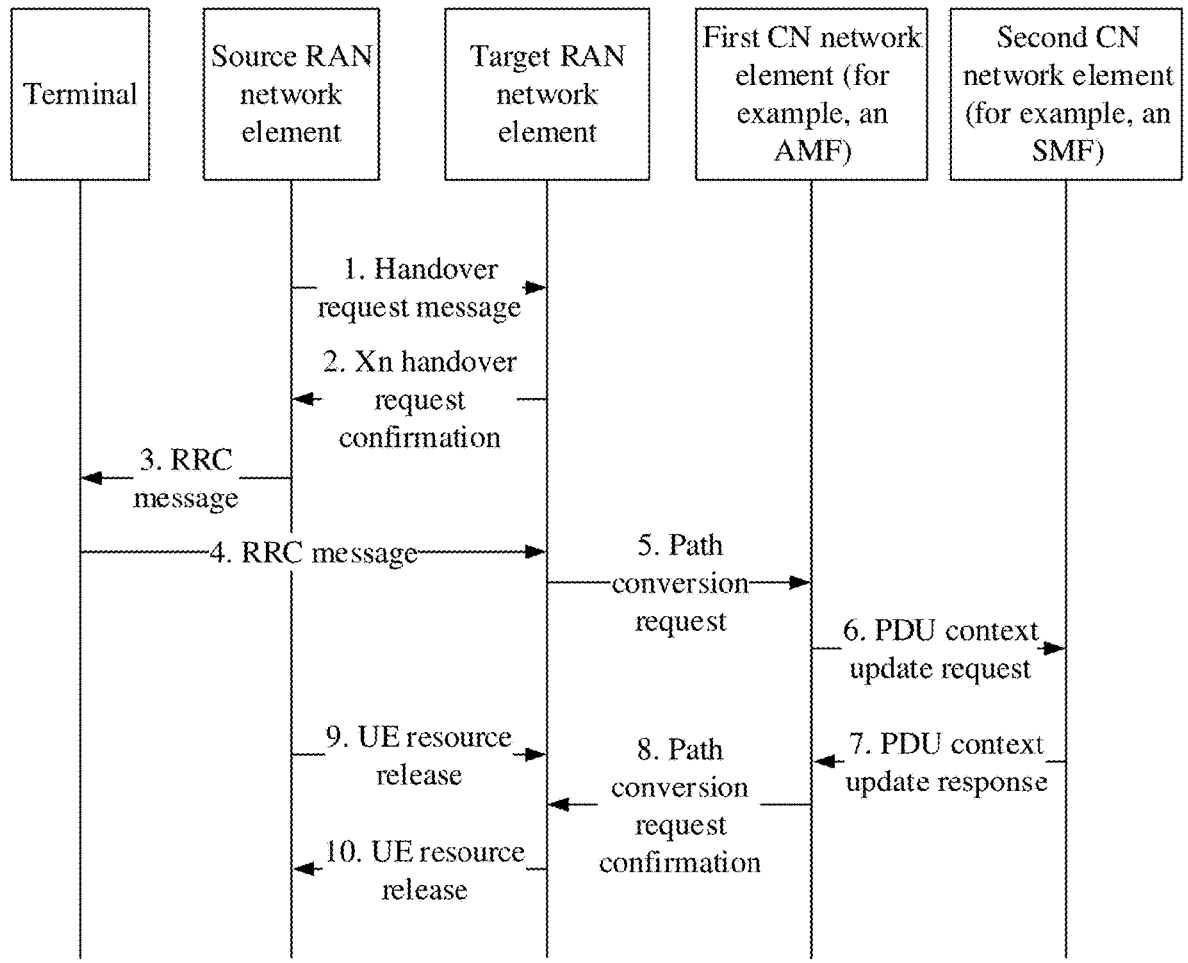
FIG. 11 is a schematic diagram of another network service control method according to some embodiments of the present disclosure.

This implementation mainly describes a process in which a source RAN network element determines whether to switch a data channel of a first service when a terminal performs handover based on an inter-RAN interface. As shown in FIG. 11, an AMF is used as an example of a first CN network element, and an SMF is used as an example of a second CN network element. The process includes the following steps:

Step 1: The source RAN network element obtains first information during registration of the terminal, and obtains second information in a PDU session establishment process.

The source RAN network element performs a second related operation of the first service and/or a second related operation of a first network based on the first information and/or the second information. This is specifically described in the embodiment of FIG. 5.

When a first condition is met (for example, a target area to which the terminal is handed over does not support and/or does not allow the first service and/or the first network), the source RAN network element determines not to switch the data channel of the first service. The source RAN network element does not send context of the data channel of the first service to a target RAN. A specific operation is described in the embodiment of FIG. 5, and details are not described herein again.

When a second condition is met (for example, the target area to which the terminal is handed over supports and/or allows the first service and/or the first network), the source RAN network element determines to switch the data channel of the first service. The source RAN network element sends context of the data channel of the first service to a target RAN. A specific operation is described in the embodiment of FIG. 5, and details are not described herein again.

The source RAN network element sends a handover request message to the target RAN network.

Step 2: A target RAN network element sends a handover request confirmation message to a source RAN network.

Step 3: The source RAN network element sends an RRC message to the terminal.

Step 4: The terminal accesses the target RAN network element and sends an RRC message to the target RAN network.

Step 5: The target RAN network element sends a path conversion request message to the AMF, and sends a PDU session that is successfully switched and/or a PDU session that fails to be switched.

Step 6: The AMF sends, to the SMF, the PDU session that is successfully switched and/or the PDU session that fails to be switched.

When a first condition is met (for example, a target area to which the terminal is handed over does not support and/or does not allow the first service and/or the first network), the SMF network element determines to suspend or delete the data channel of the first service. A specific operation is described in the embodiment of FIG. 5, and details are not described herein again.

When a second condition is met (for example, the target area to which the terminal is handed over supports and/or allows the first service and/or the first network), the SMF network element determines not to suspend or delete the data channel of the first service. A specific operation is described in the embodiment of FIG. 5, and details are not described herein again.

Step 7: The AMF returns a path conversion request confirmation message to the target RAN network element.

Step 8: The target RAN network element sends a UE context release request to a source RAN.

Step 9: The source RAN network element sends a UE context release response to the target RAN.

Figure 12:
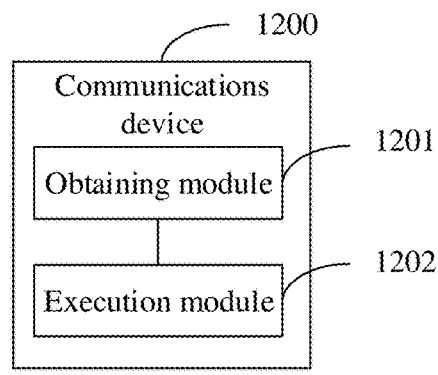
FIG. 12 is a structural diagram of a communications device according to some embodiments of the present disclosure.

Referring to FIG. 12, FIG. 12 is a structural diagram of a communications device according to some embodiments of the present disclosure. The communications device in this embodiment is the first communications device in the foregoing method embodiment. As shown in FIG. 12, a communications device 1200 includes:

an obtaining module 1201, configured to obtain first information, where the first information includes at least one of the following: first related information of a first service, first related information of a first network, information about a first DNN, area information of an allowed and/or supported area of the first DNN, network description information of a non-public network, area information of a service area of the non-public network, information about whether a current area supports and/or allows the first service, information about whether a target area supports and/or allows the first service, information about whether the current area supports and/or allows access to the first network, or information about whether the target area supports and/or allows access to the first network; and an execution module 1202, configured to perform at least one of a first related operation of the first service, a first related operation of the first DNN, or a first related operation of the first network based on the first information.

Optionally, the first network is a first public network or a first non-public network; and/or the first service is a network service of a first public network or a network service of a first non-public network; and/or the network description information includes at least one of the following: information indicating whether a network is an isolated network, network identifier information, network type information, information about an operation body of the network, DNN information, or slice information.

Optionally, the first related information of the first service includes at least one of the following:

network service description information of the first service;

network description information of the first network that provides the first service;

information about whether a terminal is allowed to access the first service;

whether the terminal is allowed to access the first service through a second network;

information about whether access to the first service is supported;

information about whether access to the first service through the second network is supported;

area information of an area in which access to the first service is allowed;

network description information of the second network in which access to the first service is allowed;

information about whether the current area allows the terminal to access the first service;

information about whether the target area allows the terminal to access the first service;

DNN information of the first service; or slice information of the first service.

Optionally, the DNN information of the first service includes at least one of the following: DNN information of the second network, where the DNN is used to access the first service; or DNN information of the first network, where the DNN is used to access the first service; and/or the slice information of the first service includes at least one of the following: slice information of the second network, where the slice is used to access the first service; or slice information of the first network, where the slice is used to access the first service; and/or the network service description information includes at least one of the following:

information about whether the network service is an isolated network service, network service identifier information, network service name information, corresponding application information, or network service type information.

Optionally, the network service identifier information includes at least one of the following: non-public network service identifier information or public network service identifier information; and/or the network service type information includes at least one of the following: a non-public network service or a public network service; and/or the network identifier information includes at least one of the following: network identifier information of a non-public network or network identifier information of a public network; and/or the network type information includes at least one of the following: a non-public network, a public network, or a public network that supports a non-public network.

Optionally, the first information is obtained from a network element of the second network.

Optionally, the second network includes at least one of the following: a non-public network, a public network, a second non-public network, or a second public network;

where when the first network is a first public network, the second network includes at least one of the following: a non-public network or a second public network; and when the first network is a first non-public network, the second network includes at least one of the following: a second non-public network or a public network.

Optionally, the first information obtained from the network element of the second network includes at least one of the following: first related information that is of the first service and that is obtained from the network element of the second network, or first related information that is of the first network and that is obtained from the network element of the second network;

where the first related information that is of the first service and that is obtained from the network element of the second network is first related information of the first service, access to which through the second network is allowed and/or supported; and the first related information that is of the first network and that is obtained from the network element of the second network is first related information of the first network, access to which through the second network is allowed and/or supported.

Optionally, the execution module 1202 is further configured to send at least one of the following: request information of first service information or request information of first network information.

Optionally, the performing the first related operation of the first service includes at least one of the following:

determining whether to initiate a request for accessing the first service;

determining whether to initiate a request for accessing the first service through a second network;

determining whether to request to establish a data channel of the first service; or determining whether to request to activate the data channel of the first service.

Optionally, the data channel of the first service includes at least one of the following: accessing the first service through the data channel of the first network of the second network, or accessing the first service through the data channel of the second network.

Optionally, the execution module 1202 is further configured to: when a first condition is met, determine that at least one of the following is performed: skipping initiating a request for accessing the first service; skipping initiating a request for accessing the first service through the second network; skipping requesting to establish a data channel of the first service; or skipping requesting to activate the data channel of the first service.

The first condition includes at least one of the following:

the current area of the terminal does not support and/or does not allow the first service and/or the first network;

the target area of the terminal does not support and/or does not allow the first service and/or the first network;

the terminal moves out of an area that is supported and/or allowed by the first service and/or the first network;

the terminal is located in or moves into an area that is not allowed by the first service and/or the first network; and the first service and/or the first network do/does not support and/or do/does not allow access through the second network and the current area of the terminal belongs to the second network;

the first service and/or the first network do/does not support and/or do/does not allow access through the second network, and the target area of the terminal belongs to the second network;

the first service is a non-public network service, the terminal moves out of a service area of a non-public network, and the non-public network service is an isolated network service;

the first service is a non-public network service, the terminal moves out of a service area of a non-public network, and the target area is not an area that is supported and/or allowed by the non-public network service;

the first service is a public network service, the terminal moves into a service area of a non-public network, and the non-public network is not an area that is supported and/or allowed by the public network service;

the current area of the terminal does not support and/or does not allow the first DNN;

the target area of the terminal does not support and/or does not allow the first DNN; or the terminal is located in or moves into an area that is not allowed by the first DNN;

and/or the execution module 1202 is further configured to: when a second condition is met, determine that at least one of the following can be performed and/or is performed:

initiating a request for accessing the first service; initiating a request for accessing the first service through the second network; requesting to establish a data channel of the first service; or requesting to activate the data channel of the first service.

The second condition includes at least one of the following:

the current area of the terminal supports and/or allows the first service and/or the first network;

the target area of the terminal supports and/or allows the first service and/or the first network;

the terminal is located in or moves into an area that is supported and/or allowed by the first service and/or the first network;

the current area of the terminal belongs to the second network, and the first service and/or the first network support/supports and/or allow/allows access through the second network;

the target area of the terminal belongs to the second network, and the first service and/or the first network support/supports and/or allow/allows access through the second network;

the first service is a non-public network service and the terminal moves into a service area of a non-public network;

the first service is a non-public network service, the terminal moves out of a service area of a non-public network, and the target area is an area that is supported/allowed by the non-public network service;

the first service is a public network service, the terminal moves into a service area of a non-public network, and the service area of the non-public network is an area that is supported/allowed by the public network service;

the current area of the terminal supports and/or allows the first DNN;

the target area of the terminal supports and/or allows the first DNN; or the terminal is located in or moves into an area that is allowed by the first DNN.

The communications device 1200 can implement processes implemented by the first communications device in the method embodiments of the present disclosure and achieve the same beneficial effect. To avoid repetition, details are not described herein again.

Figure 13:
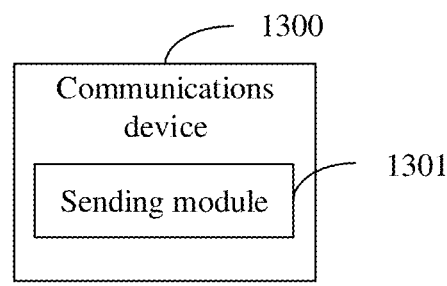
FIG. 13 is a structural diagram of another communications device according to some embodiments of the present disclosure.

Referring to FIG. 13, FIG. 13 is a structural diagram of a communications device according to some embodiments of the present disclosure. The communications device in this embodiment is the second communications device in the foregoing method embodiment. As shown in FIG. 13, a communications device 1300 includes:

a sending module 1301, configured to send first information, where the first information includes at least one of the following: first related information of a first service, first related information of a first network, information about a first DNN, area information of an allowed and/or supported area of the first DNN, network description information of a non-public network, area information of a service area of the non-public network, information about whether a current area supports and/or allows the first service, information about whether a target area supports and/or allows the first service, information about whether the current area supports and/or allows access to the first network, or information about whether the target area supports and/or allows access to the first network.

Optionally, the first network is a first public network or a first non-public network; and/or the first service is a network service of a first public network or a network service of a first non-public network; and/or the second communications device is a network element of the first network and/or a network element of a second network.

Optionally, the first related information of the first service includes at least one of the following:

network service description information of the first service;

network description information of the first network that provides the first service;

information about whether the terminal is allowed to access the first service;

whether the terminal is allowed to access the first service through the second network;

information about whether access to the first service is supported;

information about whether access to the first service through the second network is supported;

area information of an area in which access to the first service is allowed;

network description information of the second network in which access to the first service is allowed;

information about whether the current area allows the terminal to access the first service;

information about whether the target area allows the terminal to access the first service;

DNN information of the first service; or slice information of the first service.

Optionally, the first information is sent when a first preset condition is met.

The first preset condition includes at least one of the following:

request information of first service information is obtained;

request information of first network information is obtained;

first information is obtained;

the first information is determined; or the first information is updated.

The communications device 1300 can implement processes implemented by the second communications device in the method embodiments of the present disclosure and achieve the same beneficial effect. To avoid repetition, details are not described herein again.

Figure 14:
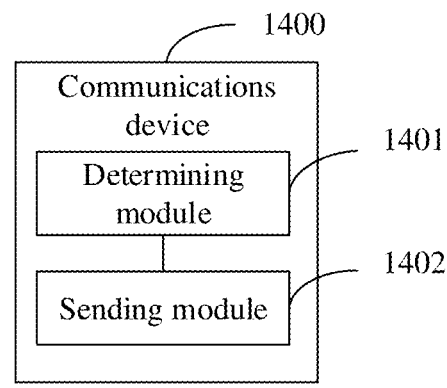
FIG. 14 is a structural diagram of another communications device according to some embodiments of the present disclosure.

Referring to FIG. 14, FIG. 14 is a structural diagram of a communications device according to some embodiments of the present disclosure. The communications device in this embodiment is the third communications device in the foregoing method embodiment. As shown in FIG. 14, a communications device 1400 includes:

a determining module 1401, configured to determine whether a preset condition is met; and a sending module, configured to send second information when it is determined that the preset condition is met, where the second information includes at least one of the following: second related information of a first service, second related information of a first network, or information about a first DNN.

Optionally, the first network is a first public network or a first non-public network; and/or the first service is a network service of a first public network or a network service of a first non-public network.

Optionally, the determining that the preset condition is met includes at least one of the following:
  determining to initiate a request for accessing the first service;
  determining to initiate a request for accessing the first service through the second network;
  determining to request to establish a data channel of the first service;
  determining to request to activate the data channel of the first service;
  determining to initiate a request for accessing the first network;
  determining to request to access the first network through the second network;
  determining to request to establish a data channel of the first network;
  determining to request to activate the data channel of the first network;
  determining to request to establish a data channel of the first DNN; or
  determining to request to activate the data channel of the first DNN.

Optionally, the second related information of the first service includes at least one of the following:
  network service description information of the first service, network description information of the first network that provides the first service, network description information of the second network, where it is requested to access the first service through the second network, DNN information of the first service, or slice information of the first service.

Optionally, the DNN information of the first service includes at least one of the following: DNN information of the second network, where the DNN is used to access the first service; or DNN information of the first network, where the DNN is used to access the first service; and/or
  the slice information of the first service includes at least one of the following: slice information of the second network, where the slice is used to access the first service; or slice information of the first network, where the slice is used to access the first service; and/or
  the network service description information includes at least one of the following: information indicating whether the network service is an isolated network service, network service identifier information, network service name information, corresponding application information, or network service type information; and/or
  the network description information includes at least one of the following: information indicating whether a network is an isolated network, network identifier information, network type information, information about an operation body of the network, DNN information, or slice information.

Optionally, the network service identifier information includes at least one of the following: non-public network service identifier information or public network service identifier information; and/or
  the network service type information includes at least one of the following: a non-public network service or a public network service; and/or
  the network identifier information includes at least one of the following: network identifier information of a non-public network or network identifier information of a public network; and/or
  the network type information includes at least one of the following: a non-public network, a public network, or a public network that supports a non-public network.

The communications device 1400 can implement processes implemented by the third communications device in the method embodiments of the present disclosure and achieve the same beneficial effect. To avoid repetition, details are not described herein again.

Figure 15:
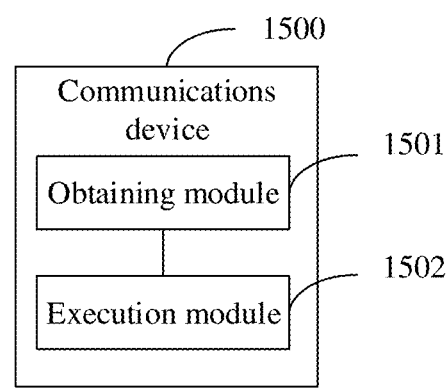
FIG. 15 is a structural diagram of another communications device according to some embodiments of the present disclosure.

Referring to FIG. 15, FIG. 15 is a structural diagram of a communications device according to some embodiments of the present disclosure. The communications device in this embodiment is the fourth communications device in the foregoing method embodiment. As shown in FIG. 15, a communications device 1500 includes:
  an obtaining module 1501, configured to obtain first information and/or second information; where
    the first information includes at least one of the following: first related information of a first service, first related information of a first network, information about a first DNN, area information of an allowed and/or supported area of the first DNN, service area information of a non-public network, information about whether a current area supports and/or allows the first service, information about whether a target area supports and/or allows the first service, information about whether the current area supports and/or allows access to the first network, or information about whether the target area supports and/or allows access to the first network; and
    the second information includes at least one of the following: second related information of the first service, second related information of the first network, or the information about the first DNN; and
  an execution module 1502, configured to perform at least one of a second related operation of the first service, a second related operation of the first DNN, or a second related operation of the first network based on the first information and/or the second information.

Optionally, the first network is a first public network or a first non-public network; and/or
  the first service is a network service of a first public network or a network service of a first non-public network; and/or
  the fourth communications device is a network element of the first network and/or a network element of a second network.

Optionally, the first related information of the first service includes at least one of the following:
  network service description information of the first service;
  network description information of the first network that provides the first service;
  information about whether the terminal is allowed to access the first service;
  whether the terminal is allowed to access the first service through the second network;
  information about whether access to the first service is supported;
  information about whether access to the first service through the second network is supported;
  area information of an area in which access to the first service is allowed;
  network description information of the second network in which access to the first service is allowed;
  information about whether the current area allows the terminal to access the first service;
  information about whether the target area allows the terminal to access the first service;

DNN information of the first service; or
slice information of the first service;
and/or
the second related information of the first service includes at least one of the following:
network service description information of the first service, network description information of the first network that provides the first service, network description information of the second network, where it is requested to access the first service through the second network, DNN information of the first service, or slice information of the first service.

Optionally, the DNN information of the first service includes at least one of the following: DNN information of the second network, where the DNN is used to access the first service; or DNN information of the first network, where the DNN is used to access the first service; and/or
the slice information of the first service includes at least one of the following: slice information of the second network, where the slice is used to access the first service; or slice information of the first network, where the slice is used to access the first service; and/or
the network service description information includes at least one of the following: information indicating whether the network service is an isolated network service, network service identifier information, network service name information, corresponding application information, or network service type information; and/or
the network description information includes at least one of the following: information indicating whether a network is an isolated network, network identifier information, network type information, information about an operation body of the network, DNN information, or slice information.

Optionally, the network service identifier information includes at least one of the following: non-public network service identifier information or public network service identifier information; and/or
the network service type information includes at least one of the following: a non-public network service or a public network service; and/or
the network identifier information includes at least one of the following: network identifier information of a non-public network or network identifier information of a public network; and/or
the network type information includes at least one of the following: a non-public network, a public network, or a public network that supports a non-public network.

Optionally, the first information is obtained from a network element of the second network.

Optionally, the second network includes at least one of the following: a non-public network, a public network, a second non-public network, or a second public network;
where
when the first network is a first public network, the second network includes at least one of the following: a non-public network or a second public network; and
when the first network is a first non-public network, the second network includes at least one of the following: a second non-public network or a public network.

Optionally, the first related information of the first service is first related information of the first service, access to which through the second network is allowed and/or supported; and/or
the second related information of the first service is second related information of the first service, access to which is requested.

Optionally, the performing the second related operation of the first service includes at least one of the following:
an operation of subscribing to a terminal location change notification;
an operation of determining a location update area of the terminal;
performing a related operation of a data channel of the first service; or
a related operation of determining whether to accept a request of the first service;
where
the performing a related operation of a data channel of the first network includes at least one of the following:
determining whether to establish a data channel of the first network;
determining whether to activate the data channel of the first network;
determining whether to switch the data channel of the first network; or
determining whether to suspend or delete the data channel of the first network.

Optionally, the data channel of the first service includes at least one of the following: accessing the first service through the data channel of the first network of the second network, or accessing the first service through the data channel of the second network.

Optionally, when a first condition is met, it is determined that a request of the first service is not accepted, context of the data channel of the first service is not sent, establishment of the data channel of the first service is rejected, activation of the data channel of the first service is rejected, the data channel of the first service is suspended or deleted, and/or the data channel of the first service is not switched.

The first condition includes at least one of the following:
the current area of the terminal does not support and/or does not allow the first service and/or the first network;
the target area of the terminal does not support and/or does not allow the first service and/or the first network;
the terminal moves out of an area that is supported and/or allowed by the first service and/or the first network; the terminal is located in or moves into an area that is not allowed by the first service and/or the first network; the first service and/or the first network do/does not support and/or do/does not allow access through the second network, and the current area of the terminal belongs to the second network;
the first service and/or the first network do/does not support and/or do/does not allow access through the second network, and the target area of the terminal belongs to the second network;
the first service is a non-public network service, the terminal moves out of a service area of a non-public network, and the non-public network service is an isolated network service;
the first service is a non-public network service, the terminal moves out of a service area of a non-public network, and the target area is not an area that is supported and/or allowed by the non-public network service;
the first service is a public network service, the terminal moves into a service area of a non-public network, and the non-public network is not an area that is supported and/or allowed by the public network service;

the current area of the terminal does not support and/or does not allow the first DNN;

the target area of the terminal does not support and/or does not allow the first DNN; or the terminal is located in or moves into an area that is not allowed by the first DNN;

and/or when a second condition is met, determining to accept a request of the first service, send context of the data channel of the first service, establish the data channel of the first service, activate the data channel of the first service, and/or switch the data channel of the first service; where the second condition includes at least one of the following:

the current area of the terminal supports and/or allows the first service and/or the first network;

the target area of the terminal supports and/or allows the first service and/or the first network;

the terminal is located in or moves into an area that is supported and/or allowed by the first service and/or the first network;

the current area of the terminal belongs to the second network, and the first service and/or the first network support/supports and/or allow/allows access through the second network;

the target area of the terminal belongs to the second network, and the first service and/or the first network support/supports and/or allow/allows access through the second network;

the first service is a non-public network service and the terminal moves into a service area of a non-public network;

the first service is a non-public network service, the terminal moves out of a service area of a non-public network, and the target area is an area that is supported/allowed by the non-public network service;

the first service is a public network service, the terminal moves into a service area of a non-public network, and the service area of the non-public network is an area that is supported/allowed by the public network service;

the current area of the terminal supports and/or allows the first DNN;

the target area of the terminal supports and/or allows the first DNN; or the terminal is located in or moves into an area that is allowed by the first DNN.

The communications device 1500 can implement processes implemented by the fourth communications device in the method embodiments of the present disclosure and achieve the same beneficial effect. To avoid repetition, details are not described herein again.

Figure 16:
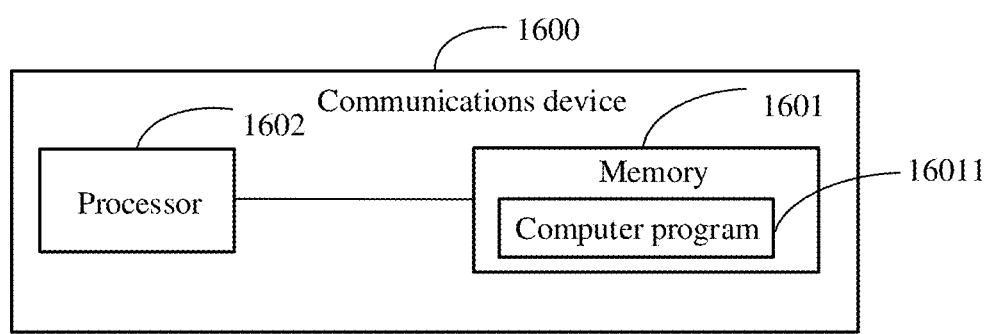
FIG. 16 is a structural diagram of another communications device according to some embodiments of the present disclosure.

Referring to FIG. 16, FIG. 16 is a structural diagram of a communications device according to some embodiments of the present disclosure. As shown in FIG. 16, a communications device 1600 includes a memory 1601, a processor 1602, and a computer program 16011 that is stored in the memory 1601 and that can run on the processor 1602.

When the communications device 1600 is represented as the first communications device in the foregoing method embodiment, the following steps are implemented when the computer program 16011 is performed by the processor 1602:

obtaining first information, where the first information includes at least one of the following: first related information of a first service, first related information of a first network, information about a first data network name DNN, area information of an allowed and/or supported area of the first DNN, network description information of a non-public network, area information of a service area of the non-public network, information about whether a current area supports and/or allows the first service, information about whether a target area supports and/or allows the first service, information about whether the current area supports and/or allows access to the first network, or information about whether the target area supports and/or allows access to the first network; and performing at least one of a first related operation of the first service, a first related operation of the first DNN, or a first related operation of the first network based on the first information.

Optionally, the first network is a first public network or a first non-public network; and/or the first service is a network service of a first public network or a network service of a first non-public network; and/or the network description information includes at least one of the following: information indicating whether a network is an isolated network, network identifier information, network type information, information about an operation body of the network, DNN information, or slice information.

Optionally, the first related information of the first service includes at least one of the following:

network service description information of the first service;

network description information of the first network that provides the first service;

information about whether a terminal is allowed to access the first service;

whether the terminal is allowed to access the first service through a second network;

information about whether access to the first service is supported;

information about whether access to the first service through the second network is supported;

area information of an area in which access to the first service is allowed;

network description information of the second network in which access to the first service is allowed;

information about whether the current area allows the terminal to access the first service;

information about whether the target area allows the terminal to access the first service;

DNN information of the first service; or slice information of the first service.

Optionally, the DNN information of the first service includes at least one of the following: DNN information of the second network, where the DNN is used to access the first service; or DNN information of the first network, where the DNN is used to access the first service; and/or the slice information of the first service includes at least one of the following: slice information of the second network, where the slice is used to access the first service; or slice information of the first network, where the slice is used to access the first service; and/or the network service description information includes at least one of the following: information about whether the network service is an isolated network service, network service identifier information, network service name information, corresponding application information, or network service type information.

Optionally, the network service identifier information includes at least one of the following: non-public network service identifier information or public network service identifier information; and/or
the network service type information includes at least one of the following: a non-public network service or a public network service; and/or
the network identifier information includes at least one of the following: network identifier information of a non-public network or network identifier information of a public network; and/or
the network type information includes at least one of the following: a non-public network, a public network, or a public network that supports a non-public network.

Optionally, the first information is obtained from a network element of the second network.

Optionally, the second network includes at least one of the following: a non-public network, a public network, a second non-public network, or a second public network;
where
when the first network is a first public network, the second network includes at least one of the following: a non-public network or a second public network; and
when the first network is a first non-public network, the second network includes at least one of the following: a second non-public network or a public network.

Optionally, the first information obtained from the network element of the second network includes at least one of the following: first related information that is of the first service and that is obtained from the network element of the second network, and first related information that is of the first network or that is obtained from the network element of the second network;
where
the first related information that is of the first service and that is obtained from the network element of the second network is first related information of the first service, access to which through the second network is allowed and/or supported; and
the first related information that is of the first network and that is obtained from the network element of the second network is first related information of the first network, access to which through the second network is allowed and/or supported.

Optionally, before the step of obtaining the first information, at least one of the following is sent: request information of first service information or request information of first network information.

Optionally, the performing the first related operation of the first service includes at least one of the following:
determining whether to initiate a request for accessing the first service;
determining whether to initiate a request for accessing the first service through a second network;
determining whether to request to establish a data channel of the first service; or
determining whether to request to activate the data channel of the first service.

Optionally, the data channel of the first service includes at least one of the following: accessing the first service through the data channel of the first network of the second network, or accessing the first service through the data channel of the second network.

Optionally, when a first condition is met, it is determined that at least one of the following is performed: skipping initiating a request for accessing the first service; skipping initiating a request for accessing the first service through the second network; skipping requesting to establish a data channel of the first service; or skipping requesting to activate the data channel of the first service.

The first condition includes at least one of the following:
the current area of the terminal does not support and/or does not allow the first service and/or the first network;
the target area of the terminal does not support and/or does not allow the first service and/or the first network;
the terminal moves out of an area that is supported and/or allowed by the first service and/or the first network;
the terminal is located in or moves into an area that is not allowed by the first service and/or the first network; and the first service and/or the first network do/does not support and/or do/does not allow access through the second network and the current area of the terminal belongs to the second network;
the first service and/or the first network do/does not support and/or do/does not allow access through the second network, and the target area of the terminal belongs to the second network;
the first service is a non-public network service, the terminal moves out of a service area of a non-public network, and the non-public network service is an isolated network service;
the first service is a non-public network service, the terminal moves out of a service area of a non-public network, and the target area is not an area that is supported and/or allowed by the non-public network service;
the first service is a public network service, the terminal moves into a service area of a non-public network, and the non-public network is not an area that is supported and/or allowed by the public network service;
the current area of the terminal does not support and/or does not allow the first DNN;
the target area of the terminal does not support and/or does not allow the first DNN; or
the terminal is located in or moves into an area that is not allowed by the first DNN;
and/or
when a second condition is met, it is determined that at least one of the following can be performed and/or is performed: initiating a request for accessing the first service; initiating a request for accessing the first service through the second network; requesting to establish a data channel of the first service; or requesting to activate the data channel of the first service.

The second condition includes at least one of the following:
the current area of the terminal supports and/or allows the first service and/or the first network;
the target area of the terminal supports and/or allows the first service and/or the first network;
the terminal is located in or moves into an area that is supported and/or allowed by the first service and/or the first network;
the current area of the terminal belongs to the second network, and the first service and/or the first network support/supports and/or allow/allows access through the second network;
the target area of the terminal belongs to the second network, and the first service and/or the first network support/supports and/or allow/allows access through the second network;
the first service is a non-public network service and the terminal moves into a service area of a non-public network;

the first service is a non-public network service, the terminal moves out of a service area of a non-public network, and the target area is an area that is supported/allowed by the non-public network service;

the first service is a public network service, the terminal moves into a service area of a non-public network, and the service area of the non-public network is an area that is supported/allowed by the public network service;

the current area of the terminal supports and/or allows the first DNN;

the target area of the terminal supports and/or allows the first DNN; or the terminal is located in or moves into an area that is allowed by the first DNN.

When the communications device 1600 is represented as the second communications device in the foregoing method embodiment, the following steps are implemented when the computer program 16011 is performed by the processor 1602:

sending first information, where the first information includes at least one of the following: first related information of a first service, first related information of a first network, information about a first DNN, area information of an allowed and/or supported area of the first DNN, network description information of a non-public network, area information of a service area of the non-public network, information about whether a current area supports and/or allows the first service, information about whether a target area supports and/or allows the first service, information about whether the current area supports and/or allows access to the first network, or information about whether the target area supports and/or allows access to the first network.

Optionally, the first network is a first public network or a first non-public network; and/or the first service is a network service of a first public network or a network service of a first non-public network; and/or the second communications device is a network element of the first network and/or a network element of a second network.

Optionally, the first related information of the first service includes at least one of the following:

network service description information of the first service;

network description information of the first network that provides the first service;

information about whether the terminal is allowed to access the first service;

whether the terminal is allowed to access the first service through the second network;

information about whether access to the first service is supported;

information about whether access to the first service through the second network is supported;

area information of an area in which access to the first service is allowed;

network description information of the second network in which access to the first service is allowed;

information about whether the current area allows the terminal to access the first service;

information about whether the target area allows the terminal to access the first service;

DNN information of the first service; or slice information of the first service.

Optionally, the first information is sent when a first preset condition is met.

The first preset condition includes at least one of the following:

request information of first service information is obtained;

request information of first network information is obtained;

first information is obtained;

the first information is determined; or the first information is updated.

When the communications device 1600 is represented as the third communications device in the foregoing method embodiment, the following steps are implemented when the computer program 16011 is performed by the processor 1602:

determining whether a preset condition is met; and sending second information when it is determined that the preset condition is met, where the second information includes at least one of the following: second related information of a first service, second related information of a first network, or information about a first DNN.

Optionally, the first network is a first public network or a first non-public network; and/or the first service is a network service of a first public network or a network service of a first non-public network.

Optionally, the determining that the preset condition is met includes at least one of the following:

determining to initiate a request for accessing the first service;

determining to initiate a request for accessing the first service through the second network;

determining to request to establish a data channel of the first service;

determining to request to activate the data channel of the first service;

determining to initiate a request for accessing the first network;

determining to request to access the first network through the second network;

determining to request to establish a data channel of the first network;

determining to request to activate the data channel of the first network;

determining to request to establish a data channel of the first DNN; or determining to request to activate the data channel of the first DNN.

Optionally, the second related information of the first service includes at least one of the following:

network service description information of the first service, network description information of the first network that provides the first service, network description information of the second network, where it is requested to access the first service through the second network, DNN information of the first service, or slice information of the first service.

Optionally, the DNN information of the first service includes at least one of the following: DNN information of the second network, where the DNN is used to access the first service; or DNN information of the first network, where the DNN is used to access the first service; and/or the slice information of the first service includes at least one of the following: slice information of the second network, where the slice is used to access the first service; or slice information of the first network, where the slice is used to access the first service; and/or the network service description information includes at least one of the following: information indicating whether the network service is an isolated network service, network service identifier information, network service name information, corresponding application information, or network service type information; and/or the network description information includes at least one of the following: information indicating whether a network is an isolated network, network identifier information, network type information, information about an operation body of the network, DNN information, or slice information.

Optionally, the network service identifier information includes at least one of the following: non-public network service identifier information or public network service identifier information; and/or the network service type information includes at least one of the following: a non-public network service or a public network service; and/or the network identifier information includes at least one of the following: network identifier information of a non-public network or network identifier information of a public network; and/or the network type information includes at least one of the following: a non-public network, a public network, or a public network that supports a non-public network.

When the communications device 1600 is represented as the fourth communications device in the foregoing method embodiment, the following steps are implemented when the computer program 16011 is performed by the processor 1602:

obtaining first information and/or second information; where the first information includes at least one of the following: first related information of a first service, first related information of a first network, information about a first DNN, area information of an allowed and/or supported area of the first DNN, service area information of a non-public network, information about whether a current area supports and/or allows the first service, information about whether a target area supports and/or allows the first service, information about whether the current area supports and/or allows access to the first network, or information about whether the target area supports and/or allows access to the first network; and the second information includes at least one of the following: second related information of the first service, second related information of the first network, or the information about the first DNN; and performing at least one of a second related operation of the first service, a second related operation of the first DNN, or a second related operation of the first network based on the first information and/or the second information.

Optionally, the first network is a first public network or a first non-public network; and/or the first service is a network service of a first public network or a network service of a first non-public network; and/or the fourth communications device is a network element of the first network and/or a network element of a second network.

Optionally, the first related information of the first service includes at least one of the following:

network service description information of the first service;

network description information of the first network that provides the first service;

information about whether the terminal is allowed to access the first service;

whether the terminal is allowed to access the first service through the second network;

information about whether access to the first service is supported;

information about whether access to the first service through the second network is supported;

area information of an area in which access to the first service is allowed;

network description information of the second network in which access to the first service is allowed;

information about whether the current area allows the terminal to access the first service;

information about whether the target area allows the terminal to access the first service;

DNN information of the first service; or slice information of the first service;

and/or the second related information of the first service includes at least one of the following:

network service description information of the first service, network description information of the first network that provides the first service, network description information of the second network, where it is requested to access the first service through the second network, DNN information of the first service, or slice information of the first service.

Optionally, the DNN information of the first service includes at least one of the following: DNN information of the second network, where the DNN is used to access the first service; or DNN information of the first network, where the DNN is used to access the first service; and/or the slice information of the first service includes at least one of the following: slice information of the second network, where the slice is used to access the first service; or slice information of the first network, where the slice is used to access the first service; and/or the network service description information includes at least one of the following: information indicating whether the network service is an isolated network service, network service identifier information, network service name information, corresponding application information, or network service type information; and/or the network description information includes at least one of the following: information indicating whether a network is an isolated network, network identifier information, network type information, information about an operation body of the network, DNN information, or slice information.

Optionally, the network service identifier information includes at least one of the following: non-public network service identifier information or public network service identifier information; and/or the network service type information includes at least one of the following: a non-public network service or a public network service; and/or the network identifier information includes at least one of the following: network identifier information of a non-public network or network identifier information of a public network; and/or the network type information includes at least one of the following: a non-public network, a public network, or a public network that supports a non-public network.

Optionally, the first information is obtained from a network element of the second network.

Optionally, the second network includes at least one of the following: a non-public network, a public network, a second non-public network, or a second public network; where when the first network is a first public network, the second network includes at least one of the following: a non-public network or a second public network; and when the first network is a first non-public network, the second network includes at least one of the following: a second non-public network or d a public network.

Optionally, the first related information of the first service is first related information of the first service, access to which through the second network is allowed and/or supported; and/or the second related information of the first service is second related information of the first service, access to which is requested.

Optionally, the performing the second related operation of the first service includes at least one of the following:

an operation of subscribing to a terminal location change notification;

an operation of determining a location update area of the terminal;

performing a related operation of a data channel of the first service; or a related operation of determining whether to accept a request of the first service;

where the performing a related operation of a data channel of the first network includes at least one of the following:

determining whether to establish a data channel of the first network;

determining whether to activate the data channel of the first network;

determining whether to switch the data channel of the first network; or determining whether to suspend or delete the data channel of the first network.

Optionally, the data channel of the first service includes at least one of the following: accessing the first service through the data channel of the first network of the second network, or accessing the first service through the data channel of the second network.

Optionally, when a first condition is met, it is determined that a request of the first service is not accepted, context of the data channel of the first service is not sent, establishment of the data channel of the first service is rejected, activation of the data channel of the first service is rejected, the data channel of the first service is suspended or deleted, and/or the data channel of the first service is not switched.

The first condition includes at least one of the following:

the current area of the terminal does not support and/or does not allow the first service and/or the first network;

the target area of the terminal does not support and/or does not allow the first service and/or the first network;

the terminal moves out of an area that is supported and/or allowed by the first service and/or the first network; the terminal is located in or moves into an area that is not allowed by the first service and/or the first network; the first service and/or the first network do/does not support and/or do/does not allow access through the second network, and the current area of the terminal belongs to the second network;

the first service and/or the first network do/does not support and/or do/does not allow access through the second network, and the target area of the terminal belongs to the second network;

the first service is a non-public network service, the terminal moves out of a service area of a non-public network, and the non-public network service is an isolated network service;

the first service is a non-public network service, the terminal moves out of a service area of a non-public network, and the target area is not an area that is supported and/or allowed by the non-public network service;

the first service is a public network service, the terminal moves into a service area of a non-public network, and the non-public network is not an area that is supported and/or allowed by the public network service;

the current area of the terminal does not support and/or does not allow the first DNN;

the target area of the terminal does not support and/or does not allow the first DNN; or the terminal is located in or moves into an area that is not allowed by the first DNN;

and/or when a second condition is met, determining to accept a request of the first service, send context of the data channel of the first service, establish the data channel of the first service, activate the data channel of the first service, and/or switch the data channel of the first service; where the second condition includes at least one of the following:

the current area of the terminal supports and/or allows the first service and/or the first network;

the target area of the terminal supports and/or allows the first service and/or the first network;

the terminal is located in or moves into an area that is supported and/or allowed by the first service and/or the first network;

the current area of the terminal belongs to the second network, and the first service and/or the first network support/supports and/or allow/allows access through the second network;

the target area of the terminal belongs to the second network, and the first service and/or the first network support/supports and/or allow/allows access through the second network;

the first service is a non-public network service and the terminal moves into a service area of a non-public network;

the first service is a non-public network service, the terminal moves out of a service area of a non-public network, and the target area is an area that is supported/allowed by the non-public network service;

the first service is a public network service, the terminal moves into a service area of a non-public network, and the service area of the non-public network is an area that is supported/allowed by the public network service;

the current area of the terminal supports and/or allows the first DNN;

the target area of the terminal supports and/or allows the first DNN; or the terminal is located in or moves into an area that is allowed by the first DNN.

The communications device 1600 can implement processes implemented by the communications device in the foregoing method embodiments. To avoid repetition, details are not described herein again.

Some embodiments of the present disclosure further provide a non-transitory computer-readable storage medium. The non-transitory computer-readable storage medium stores a computer program. When the computer program is executed by a processor, the processes of any one of the network service control method embodiments are implemented, and a same technical effect can be achieved. To avoid repetition, details are not described herein again. The non-transitory computer-readable storage medium includes a read-only memory (Read-Only Memory, ROM for short), a random access memory (Random Access Memory, RAM for short), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (for example, a ROM/RAM, a magnetic disk, or an optical disc) and includes several instructions for instructing a terminal (which may be a mobile phone, a computer, a server, an air conditioner, or a network device) to perform the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

What is claimed is:

1. A network service control method, applied to a first communications device, the network service control method comprising:

obtaining first information, wherein the first information comprises at least one of: first related information of a first service, first related information of a first network, area information of an allowed and/or supported area of a first data network name (DNN), area information of a service area of the non-public network, information about whether a current area supports and/or allows the first service, information about whether a target area supports and/or allows the first service, information about whether the current area supports and/or allows access to the first network, or information about whether the target area supports and/or allows access to the first network; and performing at least one of a first related operation of the first service, a first related operation of the first DNN, or a first related operation of the first network based on the first information; wherein the first network is a first non-public network, a second network comprises a public network, and the first service is a network service of the first network;

the first related information of the first service comprises at least one of:
whether the terminal is allowed to access the first service through the second network;
information about whether access to the first service through the second network is supported;
area information of an area in which access to the first service is allowed;
network description information of the second network in which access to the first service is allowed;
information about whether the current area allows the terminal to access the first service;
information about whether the target area allows the terminal to access the first service; or
DNN information of the first service;

the first related information of the first network comprises at least one of:
information about whether the terminal is allowed to access the first network through the second network;
information about whether access to the first network through the second network is supported;
area information of an area in which access to the first network is allowed;
network description information of the second network in which access to the first network is allowed;
information about whether the current area allows the terminal to access the first network; or
information about whether the target area allows the terminal to access the first network;

performing the first related information of the first service comprises at least one of:
determining whether to initiate a request for accessing the first service through the second network; or
determining whether to request to activate a data channel of the first service;

performing the first related operation of the first DNN comprises at least one of:
determining whether to request to establish a data channel of the first DNN; or
determining whether to request to activate the data channel of the first DNN; and performing the first related operation of the first network comprises at least one of:
determining whether to request to access the first network through the second network; or
determining whether to request to activate the data channel of the first network.

2. The method according to claim 1, wherein the network description information comprises at least one of: information indicating whether a network is an isolated network, network identifier information, network type information, information about an operation body of the network, DNN information, or slice information.

3. The method according to claim 2, wherein the network identifier information comprises at least one of: network identifier information of a non-public network or network identifier information of a public network; and/or the network type information comprises at least one of: a non-public network, a public network, or a public network that supports a non-public network.

4. The method according to claim 1, wherein the DNN information of the first service comprises at least one of: DNN information of the second network, wherein the DNN is used to access the first service; or DNN information of the first network, wherein the DNN is used to access the first service; and/or the network service description information comprises at least one of: information indicating whether the network service is an isolated network service, network service identifier information, network service name information, corresponding application information, or network service type information.

5. The method according to claim 4, wherein the network service identifier information comprises at least one of: non-public network service identifier information or public network service identifier information; and/or the network service type information comprises at least one of: a non-public network service or a public network service.

6. The method according to claim 1, wherein the obtaining the first information includes obtaining the first information from a network element of the second network.

7. The method according to claim 6, wherein the first information obtained from the network element of the second network comprises at least one of: first related information that is of the first service and that is obtained from the network element of the second network, or first related information that is of the first network and that is obtained from the network element of the second network;

wherein the first related information that is of the first service and that is obtained from the network element of the second network is first related information of the first service, access to which through the second network is allowed and/or supported; and the first related information that is of the first network and that is obtained from the network element of the second network is first related information of the first network, access to which through the second network is allowed and/or supported.

8. The method according to claim 1, wherein before obtaining the first information, at least one of: request information of first service information or request information of first network information is sent.

9. The method according to claim 1, wherein the data channel of the first service comprises at least one of: accessing the first service through a data channel of the first network of the second network, or accessing the first service through a data channel of the second network.

10. The method according to claim 9, wherein when a first condition is met, it is determined to perform at least one of: skipping initiating the request for accessing the first service; skipping initiating the request for accessing the first service through the second network; skipping requesting to establish the data channel of the first service; or skipping requesting to activate the data channel of the first service;

the first condition comprises at least one of:
the current area of the terminal does not support and/or does not allow the first service and/or the first network;
the target area of the terminal does not support and/or does not allow the first service and/or the first network;
the terminal moves out of an area that is supported and/or allowed by the first service and/or the first network;
the terminal is located in or moves into an area that is not allowed by the first service and/or the first network; and the first service and/or the first network do/does not support and/or do/does not allow access through the second network and the current area of the terminal belongs to the second network;
the first service and/or the first network do/does not support and/or do/does not allow access through the second network, and the target area of the terminal belongs to the second network;
the first service is a non-public network service, the terminal moves out of a service area of a non-public network, and the non-public network service is an isolated network service;
the first service is a non-public network service, the terminal moves out of a service area of a non-public network, and the target area is not an area that is supported and/or allowed by the non-public network service;
the first service is a public network service, the terminal moves into a service area of a non-public network, and the non-public network is not an area that is supported and/or allowed by the public network service;
the current area of the terminal does not support and/or does not allow the first DNN;
the target area of the terminal does not support and/or does not allow the first DNN; or
the terminal is located in or moves into an area that is not allowed by the first DNN;
and/or,
when a second condition is met, it is determined that at least one of: initiating a request for accessing the first service, initiating a request for accessing the first service through the second network, requesting to establish a data channel of the first service, or requesting to activate the data channel of the first service is capable of performing and/or is performed,
the second condition comprises at least one of:
the current area of the terminal supports and/or allows the first service and/or the first network;
the target area of the terminal supports and/or allows the first service and/or the first network;
the terminal is located in or moves into an area that is supported and/or allowed by the first service and/or the first network;
the current area of the terminal belongs to the second network, and the first service and/or the first network support/supports and/or allow/allows access through the second network;
the target area of the terminal belongs to the second network, and the first service and/or the first network support/supports and/or allow/allows access through the second network;
the first service is a non-public network service and the terminal moves into a service area of a non-public network;
the first service is a non-public network service, the terminal moves out of a service area of a non-public network, and the target area is an area that is supported/allowed by the non-public network service;
the first service is a public network service, the terminal moves into a service area of a non-public network, and the service area of the non-public network is an area that is supported/allowed by the public network service;
the current area of the terminal supports and/or allows the first DNN;

the target area of the terminal supports and/or allows the first DNN; or the terminal is located in or moves into an area that is allowed by the first DNN.

11. A communications device, comprising a processor, a memory, and a computer program stored in the memory and capable of running on the processor, wherein the computer program, when executed by the processor, causes the communications device to perform:
obtaining first information, wherein the first information comprises at least one of: first related information of a first service, first related information of a first network, area information of an allowed and/or supported area of a first data network name (DNN), area information of a service area of the non-public network, information about whether a current area supports and/or allows the first service, information about whether a target area supports and/or allows the first service, information about whether the current area supports and/or allows access to the first network, or information about whether the target area supports and/or allows access to the first network; and
performing at least one of a first related operation of the first service, a first related operation of the first DNN, or a first related operation of the first network based on the first information; wherein
the first network is a first non-public network, a second network comprises a public network, and the first service is a network service of the first network;
the first related information of the first service comprises at least one of:
whether the terminal is allowed to access the first service through the second network;
information about whether access to the first service through the second network is supported;
area information of an area in which access to the first service is allowed;
network description information of the second network in which access to the first service is allowed;
information about whether the current area allows the terminal to access the first service;
information about whether the target area allows the terminal to access the first service; or
DNN information of the first service;
the first related information of the first network comprises at least one of:
information about whether the terminal is allowed to access the first network through the second network;
information about whether access to the first network through the second network is supported;
area information of an area in which access to the first network is allowed;
network description information of the second network in which access to the first network is allowed;
information about whether the current area allows the terminal to access the first network; or
information about whether the target area allows the terminal to access the first network;
performing the first related information of the first service comprises at least one of:
determining whether to initiate a request for accessing the first service through the second network; or
determining whether to request to activate a data channel of the first service;
performing the first related operation of the first DNN comprises at least one of:
determining whether to request to establish a data channel of the first DNN; or
determining whether to request to activate the data channel of the first DNN; and
performing the first related operation of the first network comprises at least one of:
determining whether to request to access the first network through the second network; or
determining whether to request to activate the data channel of the first network.

12. The communications device according to claim 11, wherein the network description information comprises at least one of: information indicating whether a network is an isolated network, network identifier information, network type information, information about an operation body of the network, DNN information, or slice information.

13. The communications device according to claim 11, wherein the DNN information of the first service comprises at least one of: DNN information of the second network, wherein the DNN is used to access the first service; or DNN information of the first network, wherein the DNN is used to access the first service; and/or
the network service description information comprises at least one of: information indicating whether the network service is an isolated network service, network service identifier information, network service name information, corresponding application information, or network service type information.

14. The communications device according to claim 11, wherein the data channel of the first service comprises at least one of: accessing the first service through a data channel of the first network of the second network, or accessing the first service through a data channel of the second network.

15. The communications device according to claim 14, wherein when a first condition is met, it is determined to perform at least one of: skipping initiating the request for accessing the first service; skipping initiating the request for accessing the first service through the second network; skipping requesting to establish the data channel of the first service; or skipping requesting to activate the data channel of the first service;
the first condition comprises at least one of:
the current area of the terminal does not support and/or does not allow the first service and/or the first network;
the target area of the terminal does not support and/or does not allow the first service and/or the first network;
the terminal moves out of an area that is supported and/or allowed by the first service and/or the first network;
the terminal is located in or moves into an area that is not allowed by the first service and/or the first network; and the first service and/or the first network do/does not support and/or do/does not allow access through the second network and the current area of the terminal belongs to the second network;
the first service and/or the first network do/does not support and/or do/does not allow access through the second network, and the target area of the terminal belongs to the second network;
the first service is a non-public network service, the terminal moves out of a service area of a non-public network, and the non-public network service is an isolated network service;
the first service is a non-public network service, the terminal moves out of a service area of a non-public network, and the target area is not an area that is supported and/or allowed by the non-public network service;

the first service is a public network service, the terminal moves into a service area of a non-public network, and the non-public network is not an area that is supported and/or allowed by the public network service;

the current area of the terminal does not support and/or does not allow the first DNN;

the target area of the terminal does not support and/or does not allow the first DNN; or the terminal is located in or moves into an area that is not allowed by the first DNN;

and/or, when a second condition is met, it is determined that at least one of: initiating a request for accessing the first service, initiating a request for accessing the first service through the second network, requesting to establish a data channel of the first service, or requesting to activate the data channel of the first service is capable of performing and/or is performed, the second condition comprises at least one of:

the current area of the terminal supports and/or allows the first service and/or the first network;

the target area of the terminal supports and/or allows the first service and/or the first network;

the terminal is located in or moves into an area that is supported and/or allowed by the first service and/or the first network;

the current area of the terminal belongs to the second network, and the first service and/or the first network support/supports and/or allow/allows access through the second network;

the target area of the terminal belongs to the second network, and the first service and/or the first network support/supports and/or allow/allows access through the second network;

the first service is a non-public network service and the terminal moves into a service area of a non-public network;

the first service is a non-public network service, the terminal moves out of a service area of a non-public network, and the target area is an area that is supported/allowed by the non-public network service;

the first service is a public network service, the terminal moves into a service area of a non-public network, and the service area of the non-public network is an area that is supported/allowed by the public network service;

the current area of the terminal supports and/or allows the first DNN;

the target area of the terminal supports and/or allows the first DNN; or the terminal is located in or moves into an area that is allowed by the first DNN.

16. A network service control method, applied to a second communications device, comprising:

sending first information, wherein the first information comprises at least one of: first related information of a first service, first related information of a first network, area information of an allowed and/or supported area of a first data network name (DNN), area information of a service area of the non-public network, information about whether a current area supports and/or allows the first service, information about whether a target area supports and/or allows the first service, information about whether the current area supports and/or allows access to the first network, or information about whether the target area supports and/or allows access to the first network; wherein the first network is a first non-public network, a second network comprises a public network, and the first service is a network service of the first network;

the first related information of the first service comprises at least one of:

whether the terminal is allowed to access the first service through the second network;

information about whether access to the first service through the second network is supported;

area information of an area in which access to the first service is allowed;

network description information of the second network in which access to the first service is allowed;

information about whether the current area allows the terminal to access the first service;

information about whether the target area allows the terminal to access the first service; or DNN information of the first service; and the first related information of the first network comprises at least one of:

information about whether the terminal is allowed to access the first network through the second network;

information about whether access to the first network through the second network is supported;

area information of an area in which access to the first network is allowed;

network description information of the second network in which access to the first network is allowed;

information about whether the current area allows the terminal to access the first network; or information about whether the target area allows the terminal to access the first network.

17. The method according to claim 16, wherein the second communications device is a network element of the first network and/or a network element of the second network.

18. The method according to claim 16, wherein the first information is sent when a first preset condition is met; and the first preset condition comprises at least one of:

request information of first service information is obtained;

request information of first network information is obtained;

first information is obtained;

the first information is determined; or the first information is updated.

19. A communications device, comprising a processor, a memory, and a computer program stored in the memory and capable of running on the processor, wherein when the computer program is executed by the processor, steps of the network service control method according to claim 16 are implemented.

* * * * *